United States Patent [19]
Weiner et al.

[11] Patent Number: 5,905,380
[45] Date of Patent: *May 18, 1999

[54] ELECTROMAGNETIC WAVE, REFLECTIVE TYPE, LOW COST, ACTIVE PROXIMITY SENSOR FOR HARSH ENVIRONMENTS

[75] Inventors: Scott M. Weiner, Great Neck; Leonard D. Cohen, Brooklyn; Henry C. Paczkowski, Woodside, all of N.Y.; Joseph C. Zuercher, Brookfield, Wis.

[73] Assignee: Eaton Corporation, Cleveland, Ohio

[ * ] Notice: This patent is subject to a terminal disclaimer.

[21] Appl. No.: 08/633,191

[22] Filed: Apr. 26, 1996

Related U.S. Application Data

[63] Continuation-in-part of application No. 08/436,705, May 8, 1995, Pat. No. 5,600,253.

[51] Int. Cl.$^6$ .................................................. G01R 27/00
[52] U.S. Cl. ......................... 324/644; 324/642; 324/637
[58] Field of Search .................................. 324/771, 644, 324/642, 637; 342/128; 343/372, 777; 333/249; 340/532, 539

[56] References Cited

U.S. PATENT DOCUMENTS

| | | | |
|---|---|---|---|
| H205 | 2/1987 | Green | 342/134 |
| 4,052,666 | 10/1977 | Fletcher | 324/644 |
| 4,075,555 | 2/1978 | Wight | 324/644 |
| 4,384,819 | 5/1983 | Baker | 324/644 |
| 4,825,219 | 4/1989 | Ajioka | 343/771 |
| 4,901,083 | 2/1990 | May | 342/128 |

*Primary Examiner*—Josie Ballato
*Assistant Examiner*—Thomas Valone
*Attorney, Agent, or Firm*—Hoffmann & Baron, LLP

[57] ABSTRACT

An electromagnetic, reflective type, active proximity sensor includes a transmitter, the transmitter including a voltage controlled oscillator circuit, a transmitter circular waveguide and a transmitter polarization circuit. The voltage controlled oscillator circuit generates an output signal which is modulated such that the frequency of the output signal varies over time between a range of frequencies. The frequency varying, output signal is provided to the transmitter circular waveguide and propagated to the transmitter polarization circuit where it is circularly polarized in a first circular direction. The circularly polarized, frequency varying, output signal is radiated by the transmitter to the target, where it strikes the target and reflects back toward the sensor to form return signals. The return signals, upon being reflected, rotate in a second circular direction opposite to the first circular direction. The return signals also respectively exhibit one of the frequencies corresponding to the range of frequencies associated with the circularly polarized, frequency varying, output signal. The active proximity sensor also includes a receiver, the receiver including a receiver circular waveguide, a receiver polarization circuit and a detector. The receiver circular waveguide receives the return signals reflected from the target and the receiver polarization circuit circularly de-polarizes the return signals. Next, the detector receives and averages the return signals and generates an output signal which corresponds to the return signals. The active proximity sensor also includes an analog processor/driver circuit for processing the output signal provided by the detector.

8 Claims, 21 Drawing Sheets

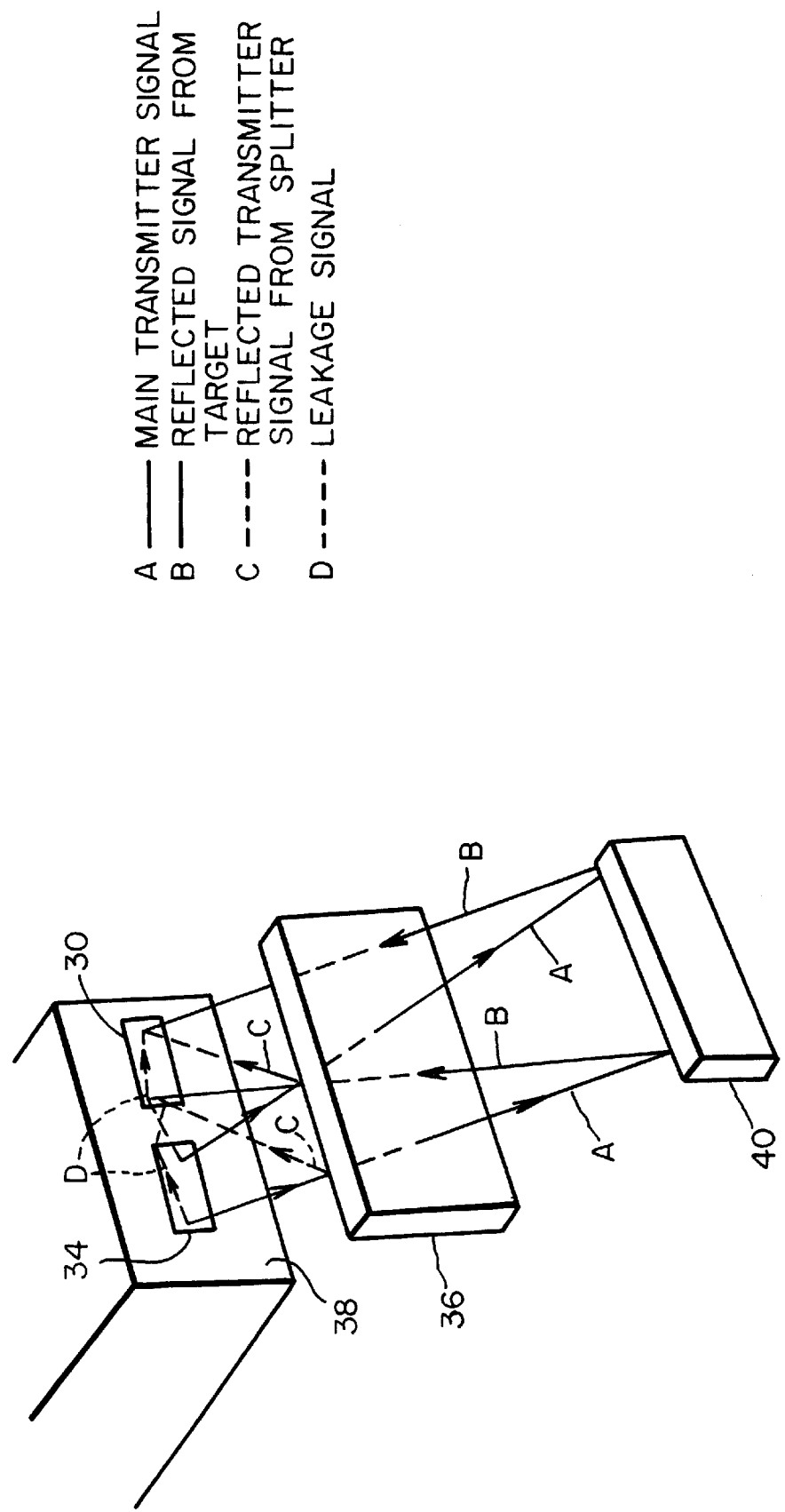

ELECTROMAGNETIC WAVE, REFLECTIVE TYPE, LOW COST, ACTIVE PROXIMITY SENSOR FOR HARSH ENVIRONMENTS

CROSS REFERENCE TO RELATED APPLICATION

This application is a continuation-in-part of U.S. patent application Ser. No. 08/436,705, filed May 8, 1995 issued Feb. 4, 1997 as U.S. Pat. No. 5,600,253.

BACKGROUND AND SUMMARY OF THE INVENTION

This invention is directed to an electromagnetic wave proximity sensor. In the context of this invention, the term "electromagnetic wave" includes both "microwave" and "millimeter wave," as well as other frequencies. Further, in the context of this invention, the term "microwave" refers to a frequency of less than about 30 GHz, and "millimeter wave" refers to a frequency greater than about 30 GHz. In order to keep the size of the proximity sensor as small as possible, the invention preferably operates at frequencies above about 30 GHz (millimeter wave). Hence, the following description of the invention will refer to the proximity sensor as being a "millimeter wave" proximity sensor, in order to simplify the description, but it should be realized that the invention is not limited to frequencies above about 30 GHz, or millimeter waves, and proximity sensors including the features of this invention operating at different frequencies are envisioned to be within the scope of this invention.

A proximity sensor is a non-contacting device for detecting the presence or absence of an object. Proximity sensors presently in use are of the following types:

a) Capacitive
b) Inductive
c) Photoelectric
d) Ultrasonic
e) Microwave Doppler (Motion)

It is the purpose of the new millimeter wave (frequency greater than 30 GHz) active proximity sensor, herein disclosed, to provide short range (from face of sensor to a few feet) sensing capability in a harsh environment, said capability not being presently available with known proximity sensors. The new features of the millimeter wave sensor are as follows:

1) A means for short range proximity sensing in harsh industrial or natural environments such as dust (e.g. grainery, mines), smoke, fog, vapor (e.g. degreaser, steam, hydrocarbon exhaust), hydrocarbon fluids (oil, grease), cleaning liquids or sprays (hydrocarbon or organic based, e.g. carbon tetrachloride, benzene, xylene, trichlorethylene), dirt, flames (fire fighting, furnaces).

An inductive type proximity sensor may be used in a harsh environment but it lacks in sensor range (0.6 inches typical for a 30 mm sensor diameter). The inductive sensor is also known to detect only metallic objects and that an increase in target size will not produce an increase in sensing range. The disclosed millimeter wave proximity sensor of the present invention provides at least a 6 times increase in detection range, relative to an inductive sensor, and its sensing range increases with target size, as optimally & theoretically shown by the graph in FIG. 1. In addition, the millimeter wave proximity sensor can detect a variety of materials, including metals, dielectrics and various liquids.

Capacitive sensors have a greater range (1.6 inches max.) than an inductive sensor, as disclosed in *The Basics of Inductive and Capacitive Proximity Presence Sensing*, Eaton Corp. Milwaukee, Wis., but are unsuitable for harsh environments due to the very significant and unacceptable effect that a harsh environment has on the operating mechanism of a capacitive sensor. Photoelectric and ultrasonic sensors rely on a non-absorbing and non-dispersive medium between their respective transmitter and the object to be detected. Most harsh environments are absorptive and dispersive, and hence are unsuitable for an ultrasonic or photoelectric proximity sensor. By contrast, the harsh environments previously exemplified are essentially transparent to millimeter wave electromagnetic radiation and the millimeter wave proximity sensor of the present invention can function effectively in said environments to detect the presence or absence of an object.

Doppler based microwave or millimeter wave sensors are intended for far field detection rather than near field (short range) detection of an object in motion and not for the detection of a stationary object. The Doppler type sensor is also not suitable for slow motion sensing due to detection sensitivity limitations incurred by the return signal being in a frequency region very close to the transmitter frequency. The signal frequency offset from the carrier decreases as the speed of the object in motion decreases.

2) A means to provide uniform detected output of an object arbitrarily located in the spatial range of the millimeter wave proximity sensor herein disclosed.

The sensor operational range is in what is known as the near field region of the transmitter output. There is a known spatial non-uniformity of the electromagnetic field in this near field region as the output of the transmitter transitions from the transmitter output waveguide port to free space. The radiated wave is non-planar in the near field region. (It transitions to a plane wave in the far field.) Due to the non-uniform spatial field distribution, it is known that sensor detection nulls from an object will be experienced at some locations in the spatial range of the sensor. A unique feature of the disclosed proximity sensor is a means to alleviate these detection nulls.

3) A means to provide a low cost transmitter source for the disclosed sensor. It is based on a new Gunn diode oscillator circuit with the following novel features:

A means for self frequency compensation with temperature.

Elimination of the need for an output isolator that is conventionally required to prevent excessive frequency change, frequency discontinuity or performance drop out with changes in output load.

Elimination of the need for a matching circuit between the output waveguide and the oscillator circuit. A matching circuit is conventionally used to ensure maximum output power to the load.

Use of the Gunn oscillator output waveguide directly as a slot type antenna, thereby eliminating the need for an external antenna.

Use of a Gunn oscillator waveguide circuit that has been reduced to an elemental form. The discrete circuit elements are a Gunn diode and a chip capacitor.

One of the objects of this invention is to provide a low power, low cost, millimeter wave (MMW) proximity sensor that provides over a 6:1 increase in minimum detection range (55 mm minimum) compared to standard 18 mm inductive proximity sensors. The design preferably includes a low cost MMW Gunn oscillator, MMW detector and analog processing/driver circuitry. The sensor is preferably designed for 3-wire operation and will fit in a standard 18 mm tube.

An initial cost analysis of the sensor assembly has been completed and results indicate that a manufactured cost of less than $100, in quantities of greater than 10,000, can be achieved.

The sensor provides approximately a 6:1 improvement in minimum detection range compared to 18 mm inductive sensors. For an 18 mm target, a standard 18 mm inductive sensor would provide 9 mm of sensing range as compared to the MMW sensor which will provide 55 mm of sensing range. An important difference between the MMW proximity sensor and conventional inductive sensor technology is that the sensing range of the present invention is a function of target size. Therefore, the sensing range of the proximity sensor of the present invention will be significantly greater for larger targets (i.e. >30:1 theoretical improvement for a 100 mm target).

A perspective view of the low cost, low power, MMW Gunn oscillator of the present invention is presented in FIG. 4. A simple monopole element is used as both the tuning circuit and interface between the Gunn diode and the output of the sensor. This greatly simplifies the circuit topology and therefore the assembly cost. This simple, robust circuit design results in a low manufactured cost and eliminates any need for circuit alignment. Two breadboarded oscillators both achieved +10 dBm output power at 35 GHz, thus meeting a 0 dBm nominal output power design goal. Excellent repeatability was observed from breadboard to breadboard.

A perspective view of the low cost MMW detector circuit of the present invention is shown in FIG. 5. The circuit was realized using a simple printed circuit and a low cost, commercially available, GaAs Schottky diode which was designed for pick and place type assembly. This resulted in an extremely simple, highly produceable, low cost circuit. Two breadboarded MMW detector circuits provided good sensitivity and very flat performance over the 30 to 37 GHz frequency range, thereby permitting a decrease in the oscillator frequency accuracy. Excellent repeatability was observed from breadboard to breadboard.

The MMW proximity sensor and a photoelectric sensor product manufactured by Eaton Corporation are similar from a functional point of view. Due to this similarity, the Eaton photoelectric ASIC was able to be used in the analog processing/driver circuitry of the present invention. This greatly reduces the circuit complexity and therefore reduces the manufactured cost. A breadboard of the analog processor/driver circuits was built and evaluated. Initial results looked excellent and the board met all design goals. A top plan view of the analog processor/driver board is presented in FIG. 6.

In accordance with one form of the invention, an electromagnetic wave, reflective type, active proximity sensor comprises:

a transmitter for transmitting radiated energy to a target, the transmitter including a Gunn oscillator circuit, the Gunn oscillator circuit including a Gunn oscillator and a Gunn driver coupled to the Gunn oscillator, the Gunn oscillator, driven by the Gunn driver, generating a pulse modulated signal which is radiated by the transmitter to the target;

a receiver, the receiver including first and second waveguides and first and second detectors respectively coupled to the first and second waveguides, the first and second waveguides receiving radiated energy reflected from the target and providing the radiated energy to the first and second detectors, respectively, each of the first and second detectors generating an output signal which corresponds to the radiated energy received by the first and second waveguides, the receiver further including a summer, the summer being coupled to the first and second detectors and being responsive to the output signals of the first and second detectors, the summer generating an output signal corresponding to the sum of the output signals of the first and second detectors; and an analog processor/driver circuit, the analog processor/driver circuit being responsive to the output signal of the summer, the processor/driver circuit including a pulse modulator generating a pulsed signal and providing the pulsed signal to the Gunn driver, an amplifier receiving the output signal of the summer and generating an amplified signal in response thereto, a synchronized demodulator signal conditioner being responsive to the amplified signal and generating an output signal in response thereto, and an output stage responsive to the output signal from the synchronized demodulator signal conditioner and generating an output signal in response thereto.

It is to be appreciated, as will be described in greater detail later, that the two waveguide/two detector embodiment described above may be implemented in order to eliminate detection nulls. Further, while the particular embodiments of the receiver of the present invention, discussed herein, refer to a direct detection technique of detecting the reflected signal, it is to be understood that the receiver may be in the form of a homodyne mixer whereby the received signal is actually mixed with a delayed version of itself. Such a configuration may provide improved detector sensitivity.

In accordance with another form of the present invention, an electromagnetic wave, reflective type, active proximity sensor includes a transmitter, a receiver and means for substantially eliminating a leakage signal (i.e., portion of transmitted output signal that leaks into the receiver) which is received by the receiver after being radiated by the transmitter. In one embodiment of the leakage signal elimination means, a beam splitter with a pre-determined thickness is positioned between the sensor and the target at a pre-determined separation distance. Accordingly, the output signal radiated by the transmitter strikes the beam splitter, and in response, the beam splitter generates a reflected signal portion and a transmitted signal portion. The transmitted signal portion continues on toward the target where it is reflected back to the sensor and received by the receiver. However, the reflected signal portion, which is approximately 180 degrees out of phase with the leakage signal, reflects back to the receiver from the beam splitter and substantially cancels the leakage signal, resulting in improved detector sensitivity. It is to be appreciated that the function of the beam splitter, in one embodiment of the present invention, may be provided by the dielectric cover shown in FIG. 3b of the drawings.

In another embodiment of the leakage signal elimination means, the transmitter and receiver each include a circular waveguide and a polarization circuit. The circular waveguide and polarization circuit of the transmitter serve to circularly polarize the output signal generated by the oscillator circuit in a first circular direction (i.e., either clockwise or counter-clockwise). The circularly polarized output signal is then radiated toward the target where it strikes the target and reflects back in the form of a return signal rotating in a second circular direction opposite to the first circular direction. Next, the return signal is received by the circular waveguide of the receiver and circularly de-polarized (i.e., returned to a linear polarization) by the receiver polarization circuit. The circularly de-polarized signal is then processed by the detector. In this manner, the receiver is responsive only to signals polarized in the second circular direction and, thus, the leakage signal radiated by the transmitter, polarized in the first circular direction, is not de-polarized by the receiver and, therefore, not processed by the detector.

In accordance with yet another form of the present invention, an electromagnetic, reflective type, active proximity sensor includes a transmitter having a voltage controlled oscillator circuit which generates an output signal which is modulated such that the frequency of the output signal varies over time between a range of frequencies. In this manner, return signals which correspond to the radiated energy reflected from the target and respectively exhibit one of the frequencies corresponding to the range of frequencies associated with the frequency varying, output signal radiated by the transmitter, are received by the receiver. The detector of the receiver averages the return signals and, in response, generates an output signal corresponding to the return signals. It is to be appreciated that the output signal generated by the voltage controlled oscillator circuit may discretely vary between at least two frequencies or, in another embodiment, sinusoidally vary between at least two frequencies.

It is to be appreciated that another object of the present invention is to provide an oscillator circuit which oscillates, thereby generating an output signal, without the need for a separate resonator. In other words, the present invention provides a self-resonating oscillator circuit in the form of a novel Gunn oscillator circuit. The discrete circuit elements, which will be described in greater detail later, preferably include a Gunn diode and a chip capacitor coupled by an inductive line having a length of approximately one quarter wavelength. It is to be appreciated that, in a preferred embodiment, the chip capacitor and the inductive line constitute a low pass filter for applying bias voltage to the Gunn diode. A post is coupled to the Gunn diode in order to provide the output signal, generated by the circuit, to a waveguide to which the circuit may be coupled. It is also to be appreciated that the oscillator circuit may be modified such that the Gunn diode may be replaced with other active elements such as an Impatt diode, an FET or an HEMT device, while still achieving the advantages of the present invention discussed herein.

A comprehensive description of the preferred forms of the proximity sensor are presented in the following section, with reference to the drawings.

BRIEF DESCRIPTION OF THE DRAWING

FIG. 13 is a perspective view of the proximity sensor of the present invention shown in FIGS. 11, 12a and 12b.

DETAILED DESCRIPTION OF THE PREFERRED EMBODIMENTS

Figure 1:
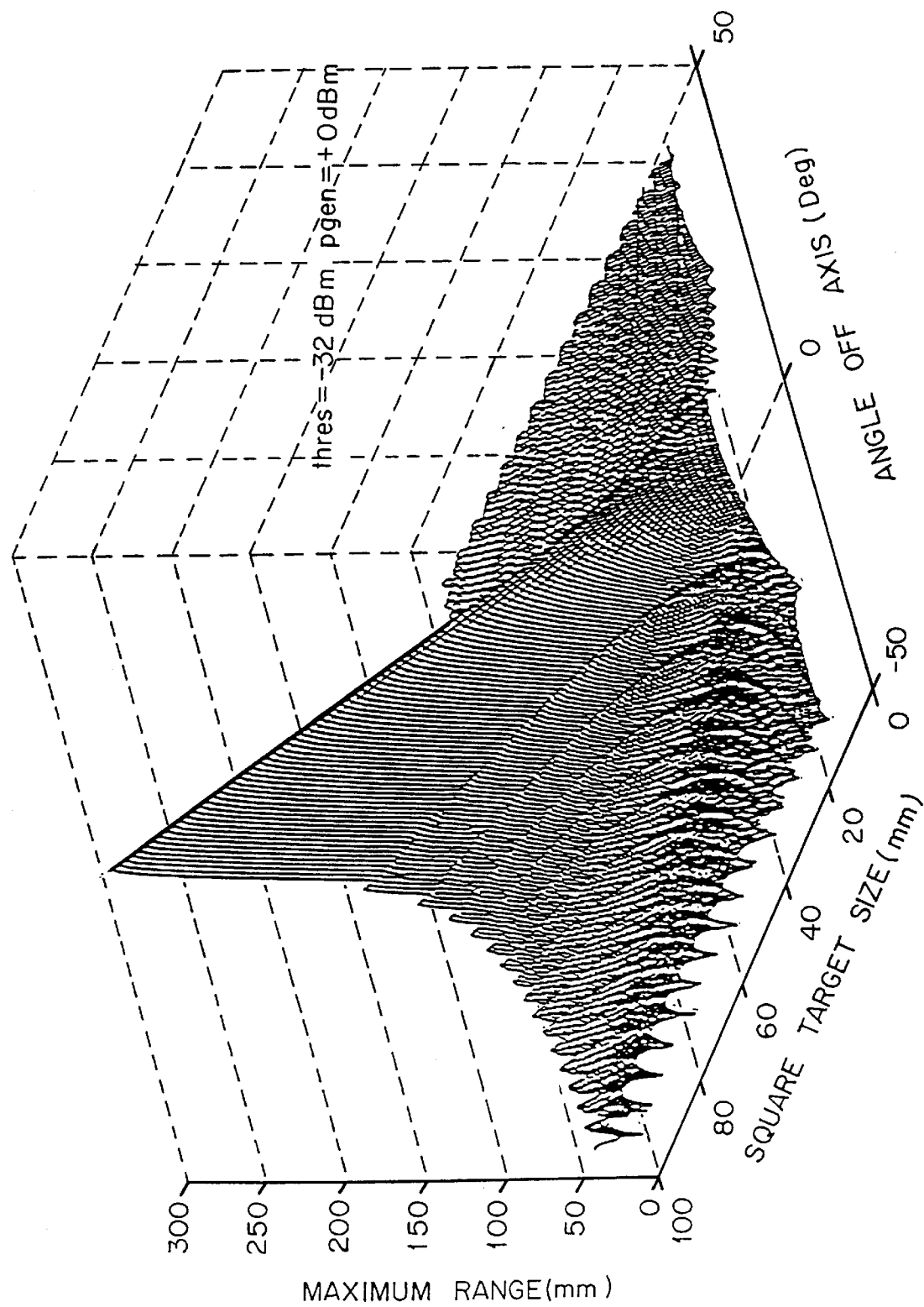
FIG. 1 is a graph in three dimensions of the maximum range vs. target size and angle off axis for a conventional proximity sensor.
Figure 2:
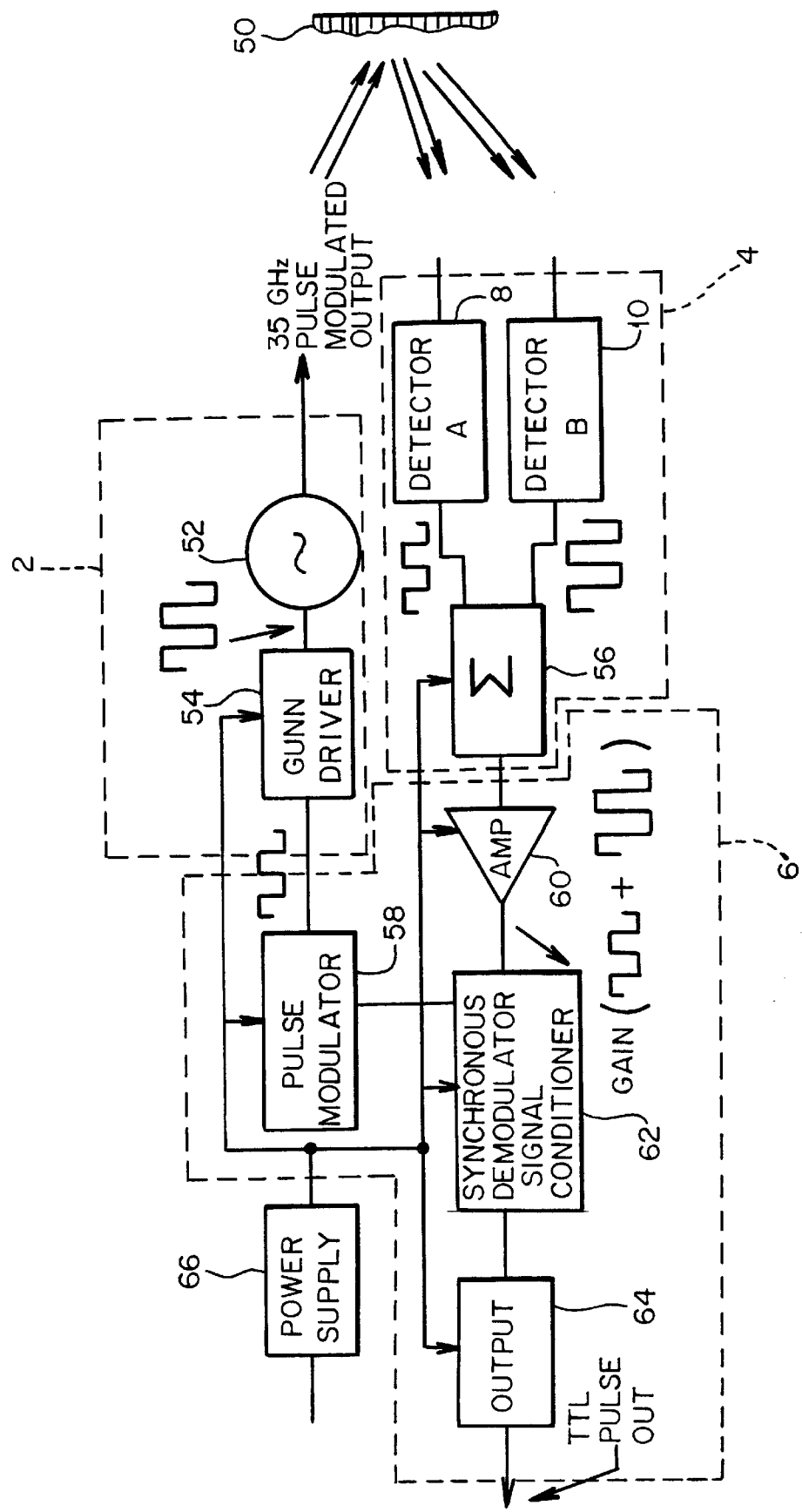
FIG. 2 is a block diagram of the millimeter wave proximity sensor formed in accordance with one form of the present invention.
Figure 3:
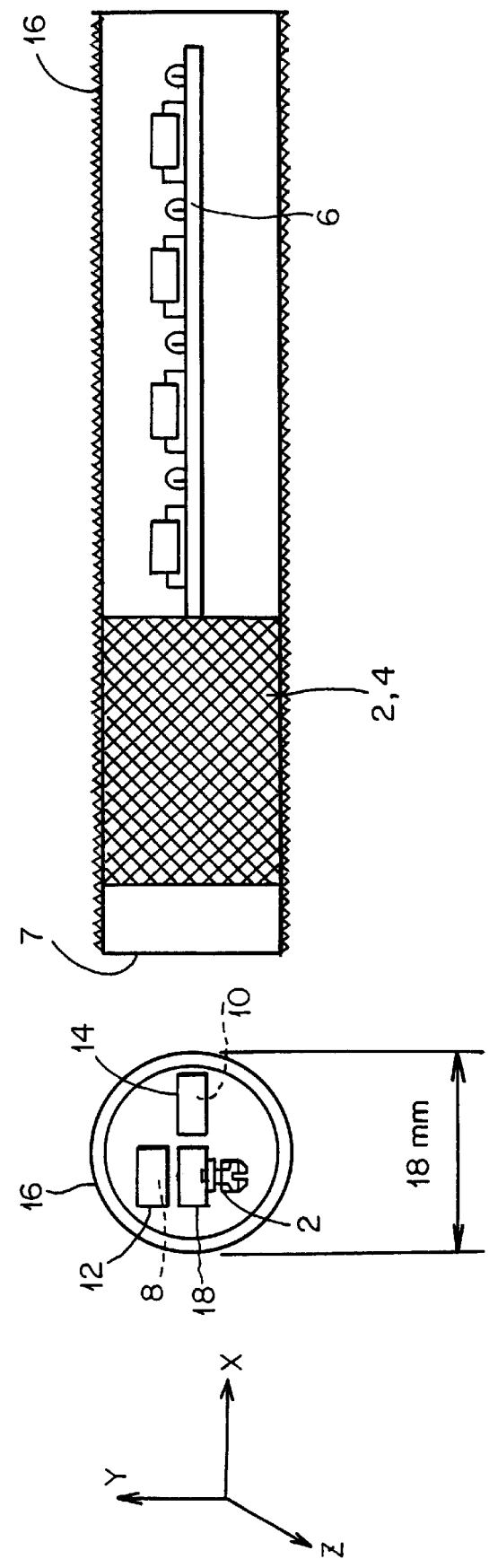
FIG. 3a is an assembly drawing, including an end view, of the millimeter wave proximity sensor of the present invention.
FIG. 3b is an assembly drawing, including a side view, of the millimeter wave proximity sensor of the present invention.
Figure 4:
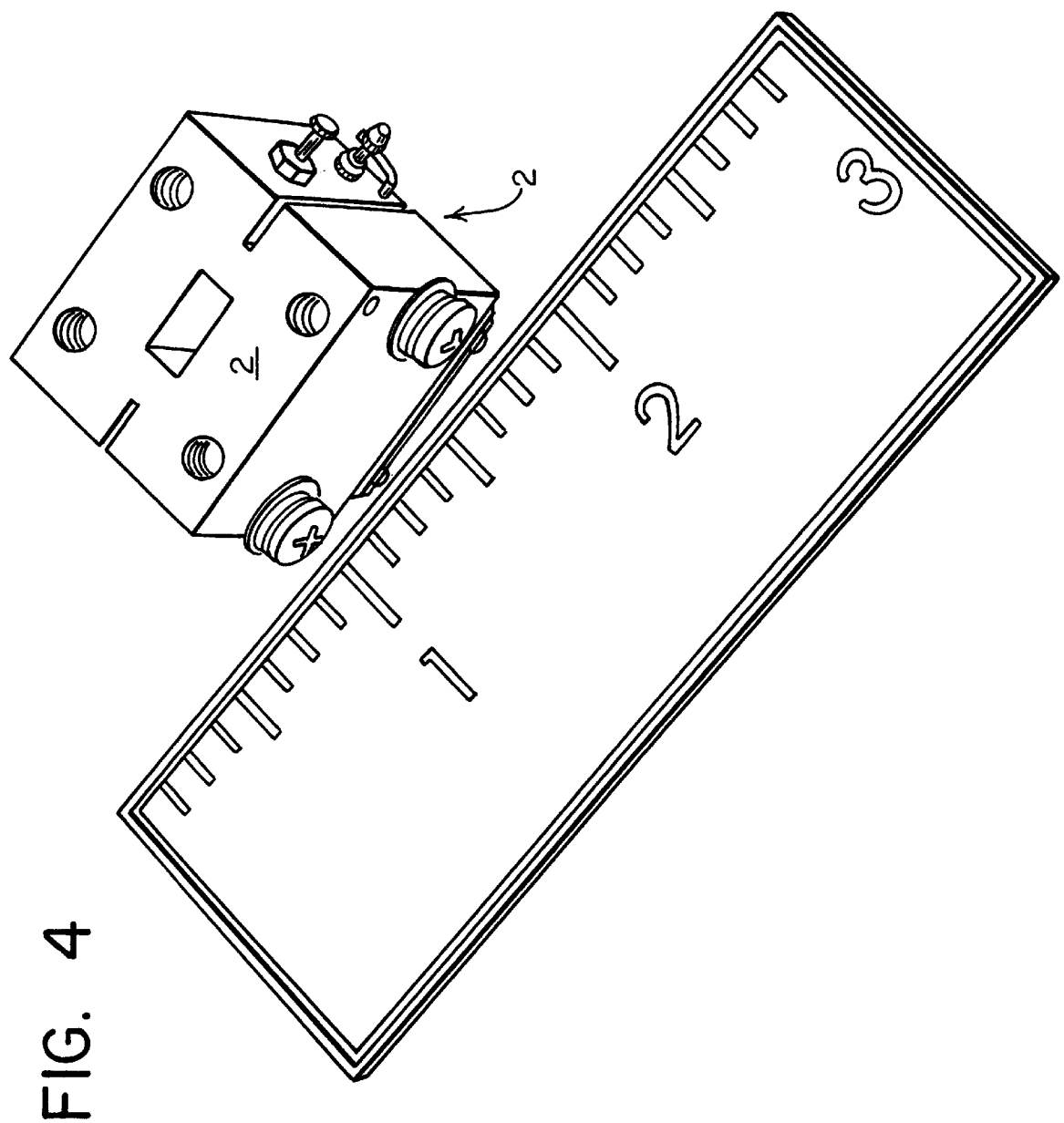
FIG. 4 is a perspective view of a first subassembly, namely, the Gunn oscillator, of the millimeter wave proximity sensor of the present invention.
Figure 5:
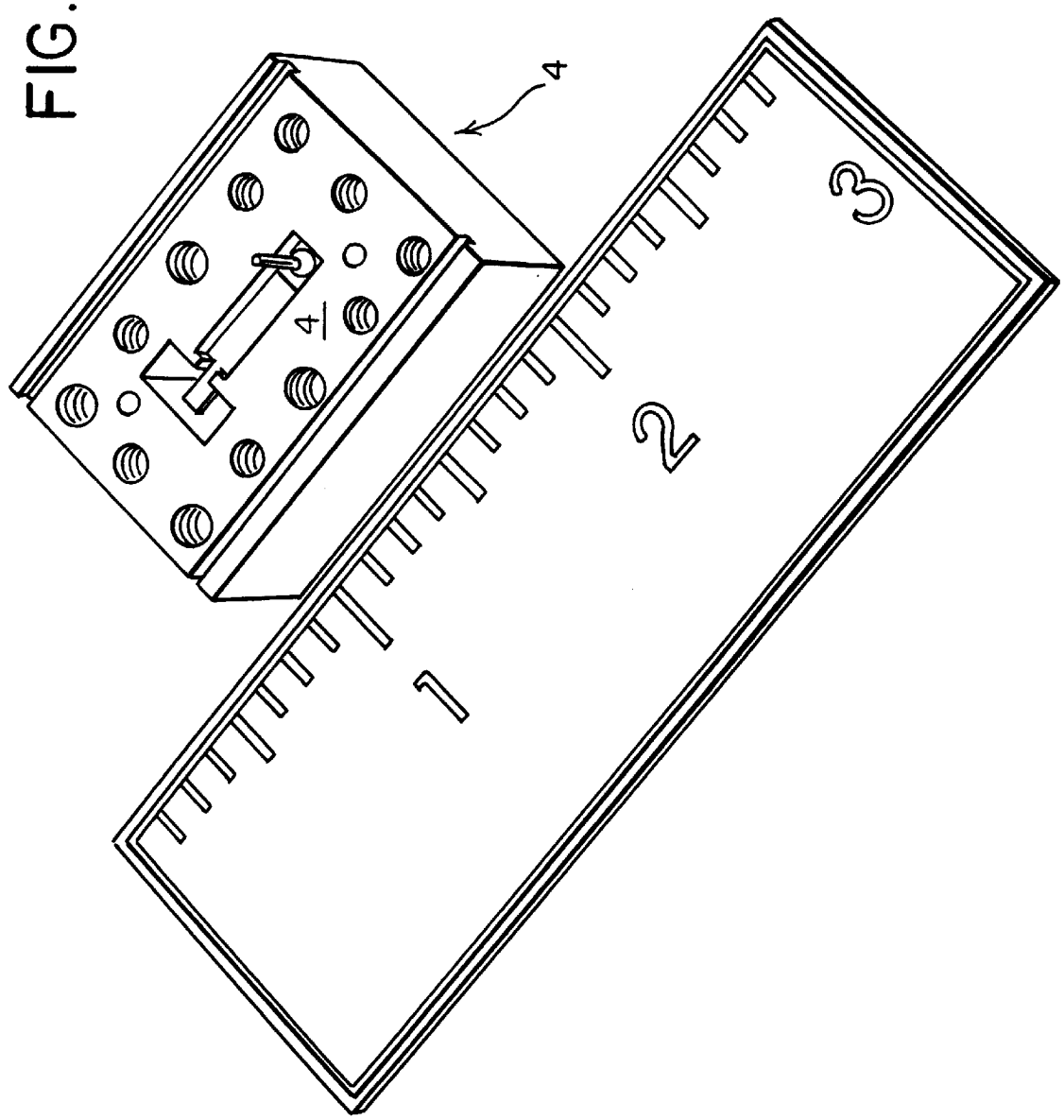
FIG. 5 is a perspective view of a second subassembly, namely, the detector, of the millimeter wave proximity sensor of the present invention.
Figure 6:
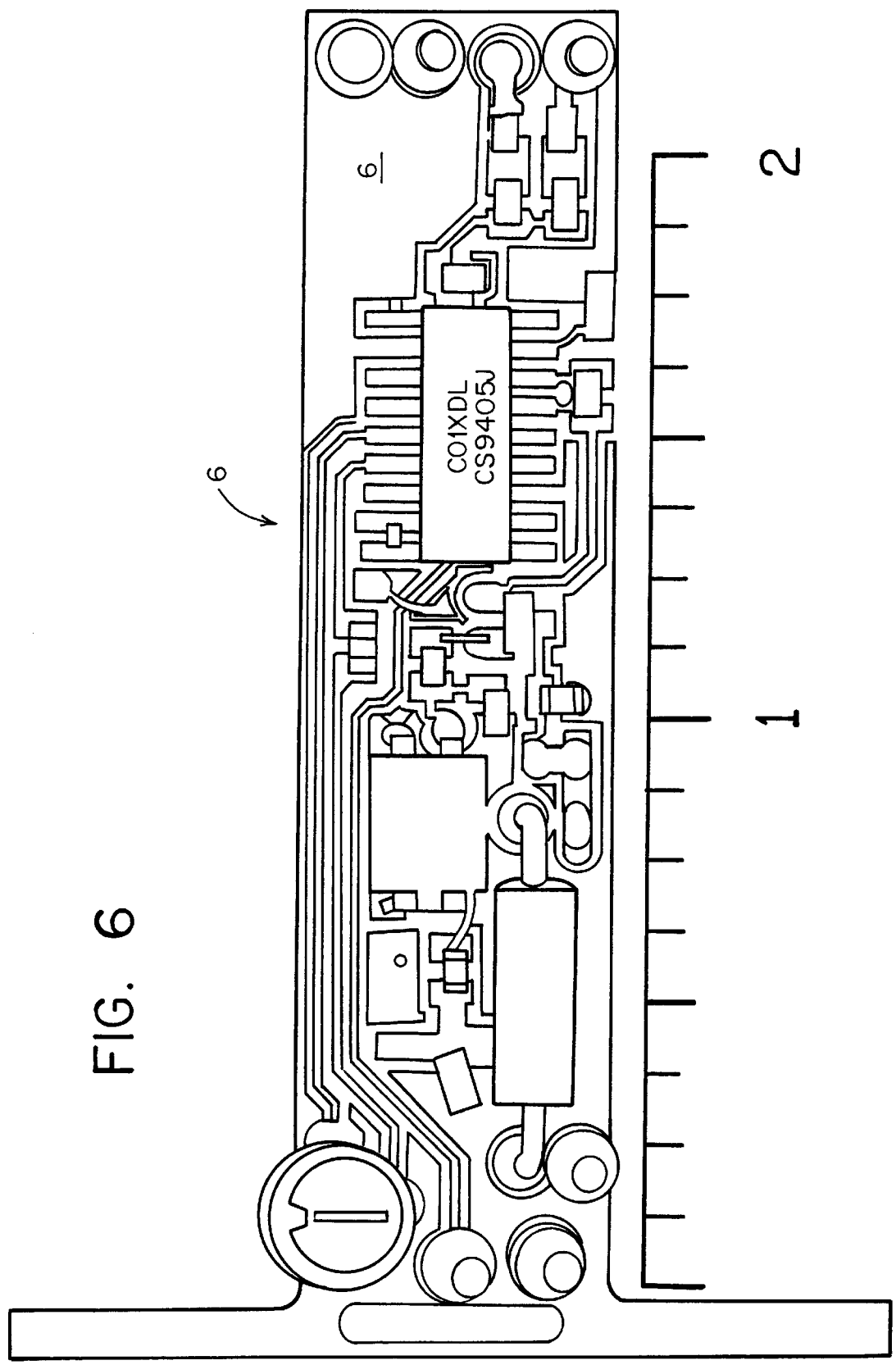
FIG. 6 is a top plan view of a third subassembly, namely, the analog processor/driver, of the millimeter wave proximity sensor of the present invention.
Figure 9A:
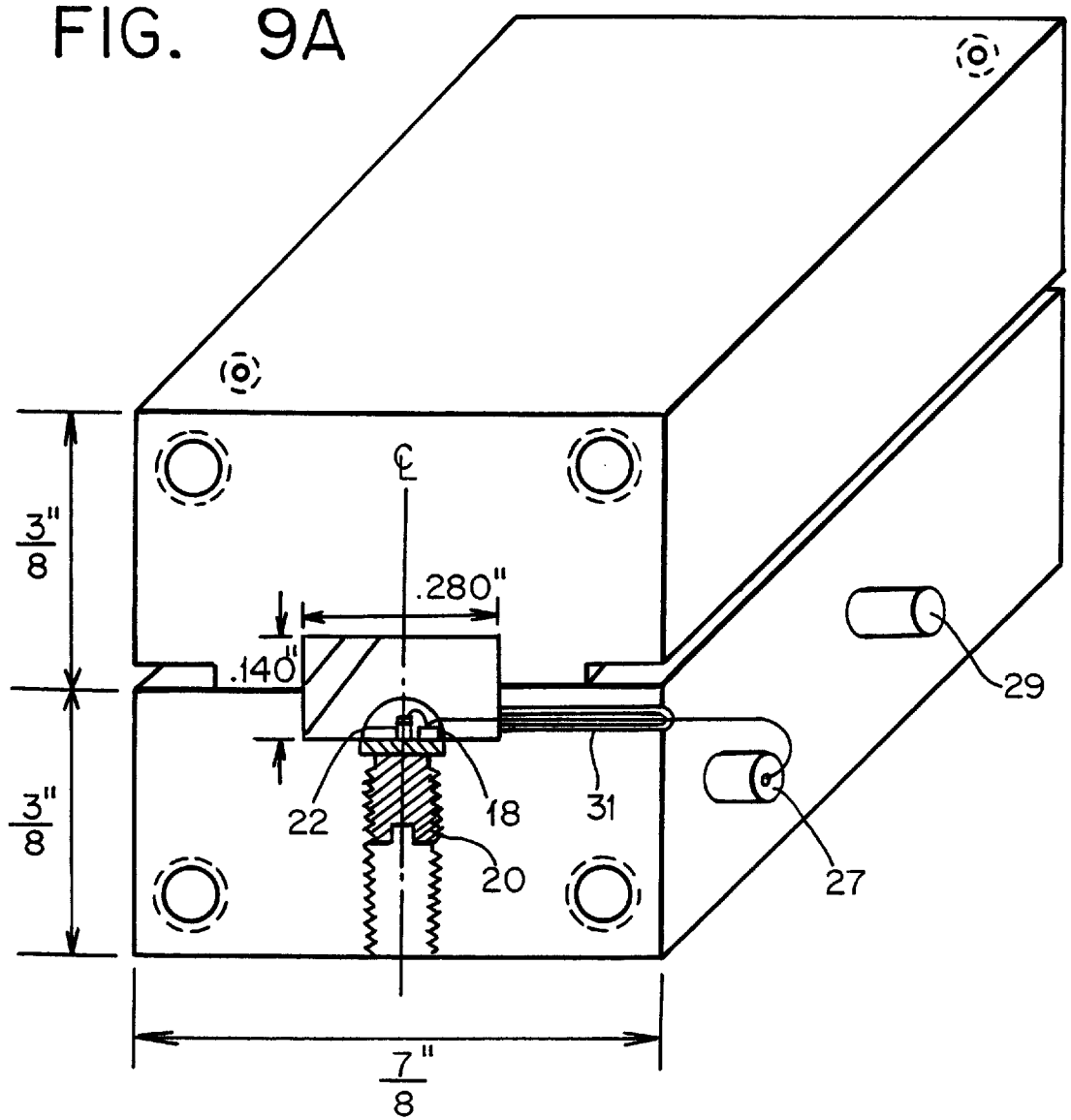
FIG. 9a is an isometric assembly drawing of the Gunn oscillator circuit of the millimeter wave proximity sensor of the present invention.
Figure 9B:
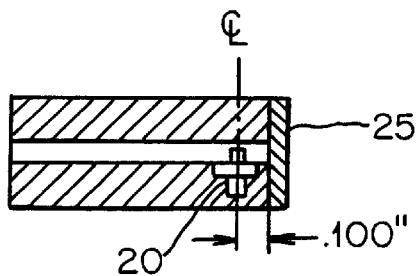
FIG. 9b is a cross-sectional view of the Gunn oscillator circuit of the millimeter wave proximity sensor of the present invention.

A block diagram and assembly drawing of the millimeter wave proximity sensor of one form of the present invention are shown in FIGS. 2, 3a and 3b. Views of the three sub-assemblies constituting the sensor, namely, the Gunn oscillator 2, detector circuit 4 and analog processor/driver 6 are shown in FIGS. 4–6. Details of the Gunn oscillator circuit 2 are shown in FIGS. 7a through 7c and 8a through 8d, and an assembly drawing of the Gunn oscillator 2 is shown in FIG. 9a and FIG. 9b.

Referring initially to FIG. 2 of the drawings, and in accordance with one form of the invention, an electromagnetic wave, reflective type, active proximity sensor includes a transmitter for transmitting radiated energy to a target 50, the transmitter including a Gunn oscillator circuit 2, the Gunn oscillator circuit including a Gunn oscillator 52 and a Gunn driver 54 coupled to the Gunn oscillator 52. The Gunn oscillator 52, driven by the Gunn driver 54, generates a pulse modulated signal which is radiated by the transmitter to the target 50.

The electromagnetic wave proximity sensor also includes a receiver, the receiver including first and second waveguides 12,14, and first and second detectors 8,10 respectively coupled to the first and second waveguides 12,14. The first and second waveguides 12,14 receive radiated energy reflected from the target 50 and provide the radiated energy to the first and second detectors 8,10, respectively. Each of the first and second detectors 8,10 generates an output signal which corresponds to the radiated energy received by the first and second waveguides 12,14. The receiver further includes a summer 56, the summer being coupled to the first and second detectors 8,10 and being responsive to the output signals of the first and second detectors. The summer 56 generates an output signal corresponding to the sum of the output signals of the first and second detectors 8,10.

The electromagnetic wave proximity sensor also includes an analog processor/driver circuit 6. The analog processor/driver circuit is responsive to the output signal of the summer 56. The processor/driver circuit 6 includes a pulse modulator 58 generating a pulsed signal and providing the pulsed signal to the Gunn driver 54, an amplifier 60 receiving the output signal of the summer 56 and generating an amplified signal in response thereto, a synchronized demodulator signal conditioner 62 being responsive to the amplified signal and generating an output signal in response thereto, and an output stage 64 responsive to the output signal from the synchronized demodulator signal conditioner 62 and generating an output signal in response thereto. The output stage 64 provides a TTL pulsed output signal or in another logic compatible format to interface properly with external circuitry. The output stage may be Eaton Corporation Part No. 109905 and the rest of processor 6 may be Eaton Corporation Part No. 109744. Also, a power supply 66 may be included to power the various components of the sensor.

The sensor is preferably designed to operate at the millimeter wave frequency of 35 GHz. A Gunn diode is used as the active element in a pulsed oscillator that is used as a transmitter. The pulsed 35 GHz signal is radiated into the target area that is designed to extend from the face of the transmitter to a distance of approximately 12 inches. When an object is in the target region, the transmitted signal is reflected back to the two detectors 8,10 contained in the two receive waveguides 12,14 in the sensor housing 16, as shown in FIG. 3a and FIG. 3b. Further, also shown in FIG. 3b, a dielectric cover 7 is mounted on the sensor housing 16 at the face of the sensor.

The target area of the sensor is in the near field region of the transmitter. It is known that in this close-in region there is a non-uniform spatial distribution of electromagnetic field as transmitter output transitions from the output waveguide port 18 of the transmitter to free space. It is also known that sensor detection nulls may result from the non-uniform spatial field distribution for an object in some locations of the sensing range. A unique feature of the sensor is the use of two detectors 8,10 in a two dimensional receive array (FIG. 3a) to alleviate the detection nulls in the near field region. The output of the detectors are series connected and summed. The location of each detector in different X and Y co-ordinates at the sensor face ensures that if one detector experiences a detection null the other will have a detected output and the series connected composite output will have a satisfactory level of output for sensor processing. Two receive waveguides 12,14 in different spatial locations, each with its own detector, are used to eliminate the null condition. FIG. 3a includes a Cartesian graph illustrating the orientation of the X, Y and Z coordinates with respect to the sensor face. Particularly, the X axis is horizontal with respect to the sensor face, the Y axis is vertical with respect to the sensor face, and the Z axis is coaxial with respect to the length of the sensor housing. It is to be appreciated that other such configurations may achieve substantial elimination of null conditions. For example, the two receive waveguides 12,14 may be respectively positioned to have only different X coordinates or different Y coordinates. Likewise, positioning the transmitter such that it has a different Z coordinate than the two receive waveguides 12,14 also may provide substantial elimination of null conditions. Still further, another embodiment of the present invention whereby the two receive waveguides 12,14 are positioned to have different Z coordinates, which are preferably approximately one quarter wavelength apart from each other, may also provide advantageous null condition elimination.

Alternate means to eliminate any detection nulls in the spatial range of the sensor are to use a FSK (frequency shift keying) or broadband noise modulated transmitter source rather than the fixed frequency Gunn diode source as previously described. With FSK modulation, the RF frequency of the transmitter is shifted rapidly between one of two frequencies. Hence, should a null detection condition exist at one frequency in the spatial frequency range of the sensor, it would not be present at the second frequency. A broadband noise modulated transmitter source would also provide an output with varying frequency content and would eliminate a detection null in the spatial range of the sensor in the manner described for FSK modulation. With FSK or broadband noise modulation it would be possible to use one receiver rather than the two receiver configuration as previously described for a fixed frequency Gunn oscillator. A particular implementation of the FSK modulation technique will be described later, in greater detail, in the context of the embodiment of the present invention depicted in FIG. 17.

Another means to eliminate detection nulls in the spatial range of the sensor is to chirp the output of the pulsed Gunn oscillator 2 over the width of the output RF pulse. As previously described for the two receiver sensor configuration, pulsing of the RF output of the Gunn diode is accomplished by pulsing the bias voltage applied to the Gunn diode. A train of rectangular bias voltage pulses drives the Gunn diode bias from zero to a constant value of operating voltage during the width of the pulse. The RF frequency is constant over the duration of the pulse since bias voltage is constant. In order to chirp the output frequency, pulsed bias voltage that is not constant in amplitude is preferably used (e.g. trapezoidal pulse). Chirping of output frequency results from the known pushing characteristic of a Gunn oscillator (and other oscillator types) and is manifest by a change in oscillator frequency with the magnitude of the applied bias voltage. Hence, with a chirped sensor transmitter output, the sensor receiver would not experience a detection null since if a detection null occurs at a particular frequency, a null would not be present over the range of the other frequencies constituting the frequency chirp. With this chirp technique, it would be possible to use one receiver for the proximity sensor rather than the two receiver configuration previously described.

RF leakage from the transmitter output waveguide port 18 directly into the receiver waveguide ports 12,14 is minimized by optimizing the longitudinal position of the transmitter port relative to the receiver ports. Minimizing the RF leakage will maximize the tangential sensitivity of the receiver.

The 35 GHz transmitter source used in the sensor uses a Gunn diode as the active element in a novel oscillator circuit. The novel features of the Gunn diode oscillator 2 were previously delineated and a detailed description of the oscillator circuit is to follow.

Figure 7B:
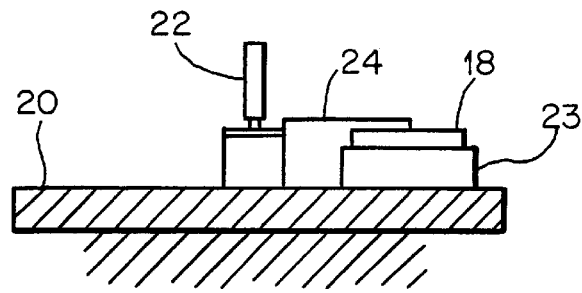
FIG. 7b is a side view of the Gunn oscillator circuit of the millimeter wave proximity sensor of the present invention.
Figure 7C:
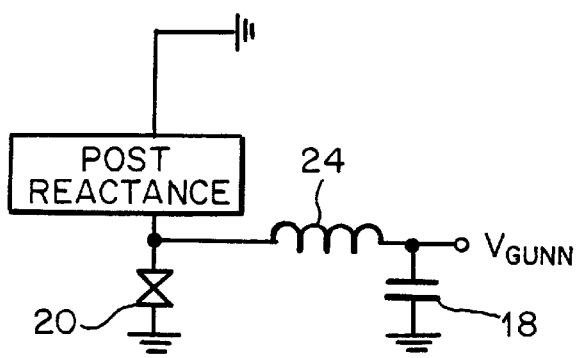
FIG. 7c is an equivalent schematic of the Gunn oscillator circuit of the millimeter wave proximity sensor of the present invention.
Figure 7A:
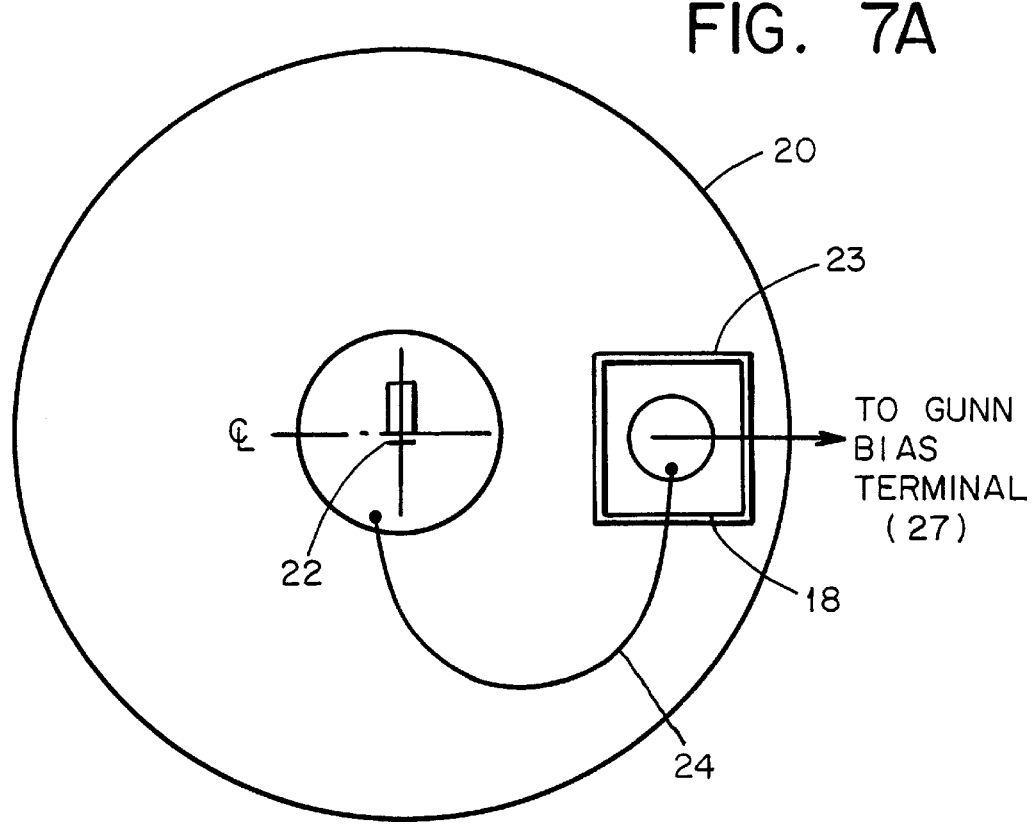
FIG. 7a is a top view of the Gunn oscillator circuit of the millimeter proximity sensor of the present invention.
Figure 8A:
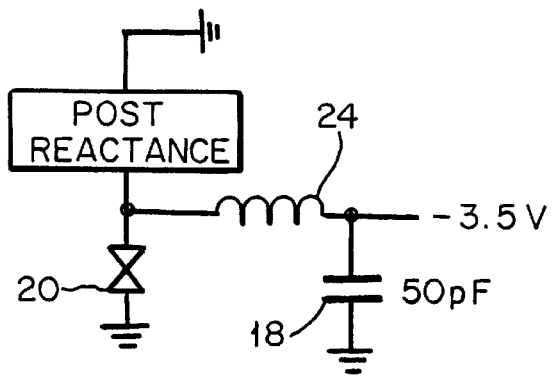
FIG. 8a is an equivalent schematic of the Gunn oscillator circuit of the millimeter wave proximity sensor of the present invention.
Figure 8B:
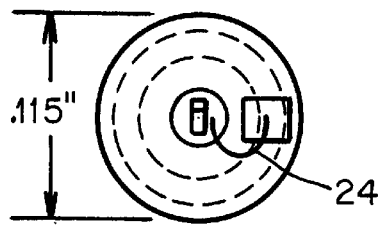
FIG. 8b is a top view of the Gunn oscillator circuit of the millimeter wave proximity sensor of the present invention.
Figure 8C:
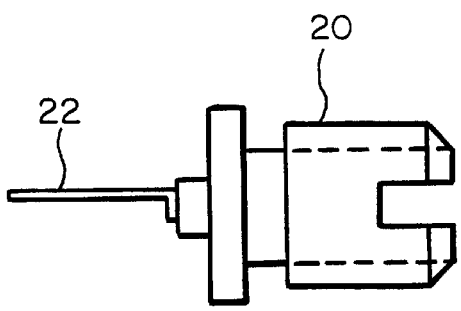
FIG. 8c is a side view of the Gunn oscillator circuit of the millimeter wave proximity sensor of the present invention.
Figure 8D:
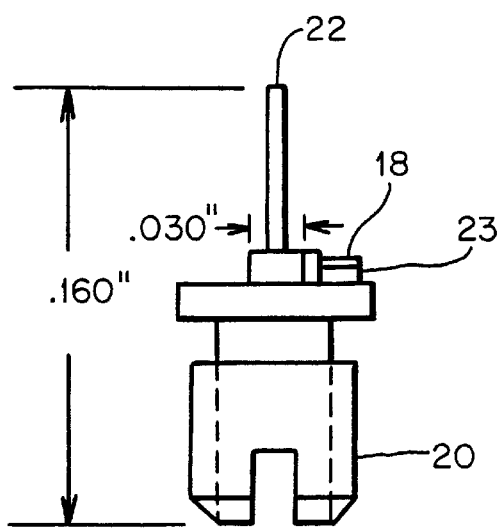
FIG. 8d is another side view of the Gunn oscillator circuit of the millimeter wave proximity sensor of the present invention.

A circuit diagram and circuit layout of the oscillator 2 are presented in FIGS. 7a through 7c and 8a through 8d. A perspective view of the assembled oscillator is shown in FIG. 4 and an assembly drawing is shown in FIG. 9a and FIG. 9b. The elemental form of the oscillator is evident from the small size of the oscillator circuit and the low parts count. The discrete circuit elements are a standard packaged Gunn diode 20 and a chip capacitor 18. As illustrated in FIG. 7a and FIG. 7b, the chip capacitor 18 is mounted on the Gunn diode 20 with a copper spacer 23 positioned therebetween. A thin and narrow metal post 22 (e.g. 0.006"×0.008") is bonded to the 0.030" diameter top cap of the Gunn diode 20. All the elements of the oscillator circuit are bonded to the Gunn diode and contained within its 0.115 inch flange diameter. The post 22 is sized such that its reactance in combination with Gunn diode and circuit reactances present a resonant circuit to the negative resistance of the Gunn diode 20 at the 35 GHz frequency of oscillation. It is preferred if the post 22 does not contact the top wall of the waveguide embodiment. Post length is a primary determinant of oscillator frequency. The shorter the length of the post, the higher is the oscillation frequency.

Figure 10B:
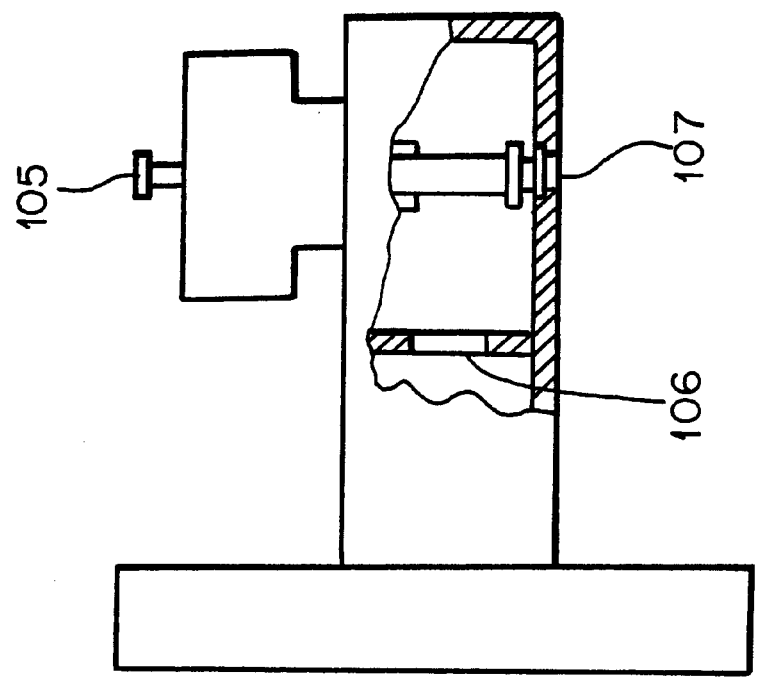
FIG. 10a is a front view, partially broken away, of a conventional Gunn oscillator circuit.
FIG. 10 is a side view, partially broken away, of a conventional Gunn oscillator circuit.
Figure 10A:
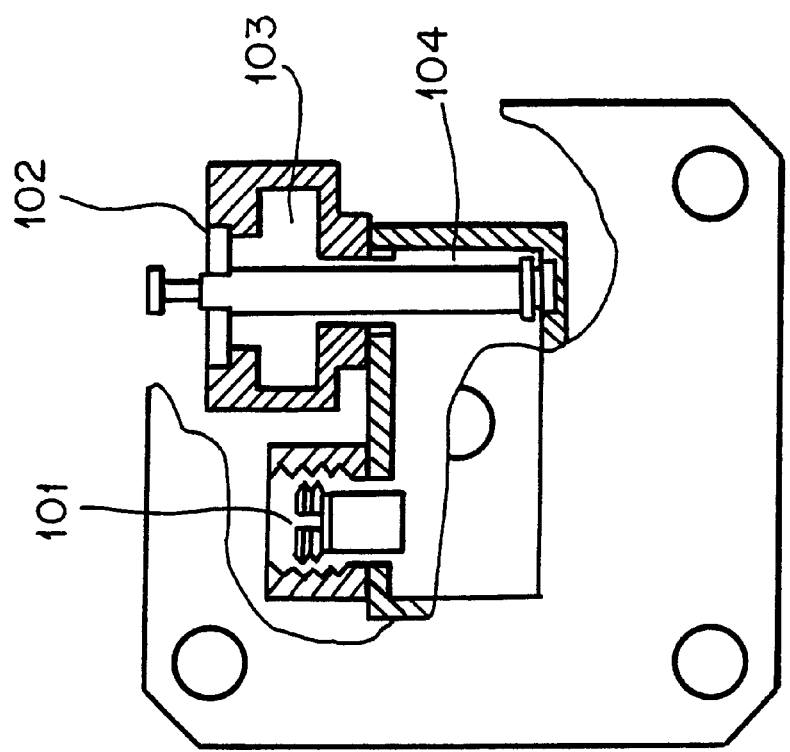

The length of the line 24 connecting the Gunn diode and the chip capacitor is nominally one quarter wavelength, and in combination with the chip capacitor constitutes a low pass filter for applying bias voltage to the Gunn diode. FIG. 9a also illustrates the location and connectivity of the Gunn bias terminal 27 to the oscillator circuit via microcoax 31. Also shown in FIG. 9a is the location of the ground terminal 29 of the oscillator circuit. This arrangement is novel and different from that used in conventional Gunn oscillators, such as disclosed in *Gunn Diode Circuit Handbook*, No. HB-9000, Microwave Associates, where bias is applied to the Gunn diode via a metal post that contacts the top cap of the Gunn diode and extends through and is insulated from the top wall of the waveguide. The portion of the post extending outward from the top wall is fabricated as a coaxial line with low and high impedance quarter wave sections that constitute a low pass filter for applying basis to the Gunn diode. This conventional biasing arrangement is illustrated in FIG. 10a and FIG. 10b and is from the *Gunn Diode Circuit Handbook* referenced above. The conventional biasing arrangement, as illustrated in FIGS. 10a and 10b, includes a tuner 101, a bypass 102, a choke 103, a post coupling 104, a bias terminal 105, an iris hole 106 and a diode 107. This biasing arrangement is more complex and expensive to fabricate and assemble than the chip capacitor arrangement, disclosed herein, and therefore is unsuitable for an oscillator where low cost is a primary objective. In addition, the non-contacting nature of the post 22 to the top wall of the waveguide in the present invention provides a simple means by which the oscillator can be provided with self-compensation of the frequency change that is known to occur with oscillators due to changes in temperature. Frequency compensation with temperature change is accomplished in the following manner.

If the post 22 in the present invention was of the same material as the waveguide embodiment (e.g. copper), the gap between the top wall of the waveguide and the top of the post would increase with temperature due to the difference in length between the height of the waveguide and the height of the post. An increase in gap size has been measured to result in an increase in oscillator frequency. Simultaneous with this thermal expansion is the expansion of the waveguide length between the post and the fixed back short 25 (FIG. 9b) which causes a decrease in oscillator frequency. These effects are not offsetting and the net effect is for oscillator frequency to decrease with increasing temperature. Self frequency compensation is obtained by making the post 22 of a material with a lower coefficient of thermal expansion than that of the waveguide. For example, for a copper waveguide the coefficient of thermal expansion is $16.8 \times 10^{-6}/°C$. and for a post made of Invar the coefficient is $0.9 \times 10^{-6}/°C$. Thus, for a copper waveguide circuit embodiment with an Invar post, the gap between the top wall of the waveguide and the post will be larger with a temperature increase than that with a copper post. The larger gap will produce a larger increase in oscillator frequency relative to that with a copper post and will offset the decrease in frequency that is characteristic of the uncompensated oscillator. Frequency/temperature compensation in this new oscillator circuit is accomplished without the addition of any additional parts to the uncompensated oscillator.

The measured external Q factor of the oscillator 2 was 110. The measured output power of several oscillators indicates that the oscillators are critically coupled (matched) to the output waveguide load. Conventional Gunn oscillators use an appropriately spaced coupling iris at the output port of the oscillator to match the oscillator to the output load, as shown in FIG. 10b. The oscillator of the present invention described herein does not require a coupling iris or any other matching network to establish a matched condition. The matched condition required for maximum output power is indicated to be inherent to the oscillator circuit. The Gunn diodes used in these oscillators were tested by the vendor in their standard critically coupled (matched) cavity oscillator. The output power measured by the vendor under these conditions was near equal to the output power measured in the oscillator circuit disclosed herein.

Testing also indicated that the oscillator 2 could be operated without any external isolation between the load and the oscillator (e.g. ferrite isolator) into high VSWR loads (at least 4.5:1) without significant disturbance of oscillator performance. With a low VSWR load (1.22), the pulling of the oscillator was ±30 MHZ, corresponding to 0.094% of oscillation frequency (35 GHz). Pulling of an oscillator is the change in oscillator frequency that results when a load of a given VSWR is changed through all phase (±180 degrees).

The good pulling characteristics of the oscillator is indicated as also being intrinsic to the oscillator circuit.

The millimeter wave proximity sensor design of the present invention described previously has been modified in a further embodiment of the present invention for the purpose of increasing its detection sensitivity and simplifying its form which decreases its cost and size. Whereas the previously described design used two waveguide receivers 12,14, each with a millimeter wave detector 8,10, the new upgraded configuration contains only one waveguide receiver 30 and one millimeter wave detector 32. Block diagrams and layouts of this alternative embodiment of the proximity sensor and that which was previously disclosed are shown in FIGS. 11, 12a and 12b and FIGS. 2, 3a and 3b, respectively. The design shown in FIGS. 11, 12a and 12b, the one receiver configuration, is the preferred form for the proximity sensor. A larger waveguide (WR-28) 34 is used for the transmitter than is used for the receiver (WR-22) 30 for the 35 GHz prototype sensor in order to narrow the transmitter beamwidth and thereby obtain a larger target return and minimize false target returns.

The new configuration (FIGS. 11, 12a and 12b) is simpler, lower cost and exhibits higher detection sensitivity than the previously disclosed design (FIGS. 2, 3a and 3b). The increase in detection sensitivity follows from the use of a unique means to decrease to an insignificant level the transmitter signal that leaks directly into the receiver waveguide port 30. Said leakage is significantly less than that experienced with the previous design using two receivers 12,14 (FIGS. 2, 3a and 3b). The leakage of transmitter signal into the receiver port(s) deteriorates sensor performance since it limits the minimum level of target return that can be detected. In addition, it is known that transmitter to receiver leakage contributes to the amplitude of the ripple that is present in normal sensor operation as a function of sensor to target distance. Since ripple amplitude limits the performance capability of the sensor (e.g. range setability, hysteresis), it is preferred that transmitter to receiver leakage be reduced to an insignificant level.

The means used to desensitize the sensor from the effects of transmitter to receiver leakage is shown in FIG. 13. A dielectric beam splitter 36 is spaced approximately a quarter wavelength from the transmitter and receiver waveguide ports 34,30 in the face 38 of the sensor housing. A direct leakage path from the transmitter to the receiver port is shown by dashed line D, said leakage resulting in a degradation of sensor performance. The main beam from the transmitter (solid line A) impinges upon the beam splitter 36 which is a low loss dielectric plate (e.g. Lexan). Most of the transmitter signal passes through the plate to the target 40. The target return to the receiver port is shown by solid line B. A small portion of the main beam is reflected back to the receiver port 30 (dashed line C). The plate thickness is approximately half wavelength in the dielectric and is sized to provide the desired level of reflected signal. With the dielectric plate 36 spaced near a quarter wavelength from the receiver port 30, the reflected energy is 180° out of phase with the direct leakage signal and hence, nullifies the effect of the transmitter leakage on sensor performance. The effective isolation between transmitter and receiver ports 34,30 has been measured to be more than 40 dB with this means of leakage suppression. It should be appreciated that the dielectric cover 7 (FIG. 3b) may function as the beam splitter 36 in an alternative embodiment of the present invention.

It should be noted that although the design of the proximity sensor was described at 35 GHz, the design can be implemented at any millimeter wave, submillimeter wave or microwave frequency. In addition, although the design described used a Gunn diode as the active element, other active elements such as Impatt diode, FET or HEMT devices can also be used.

Figure 11:
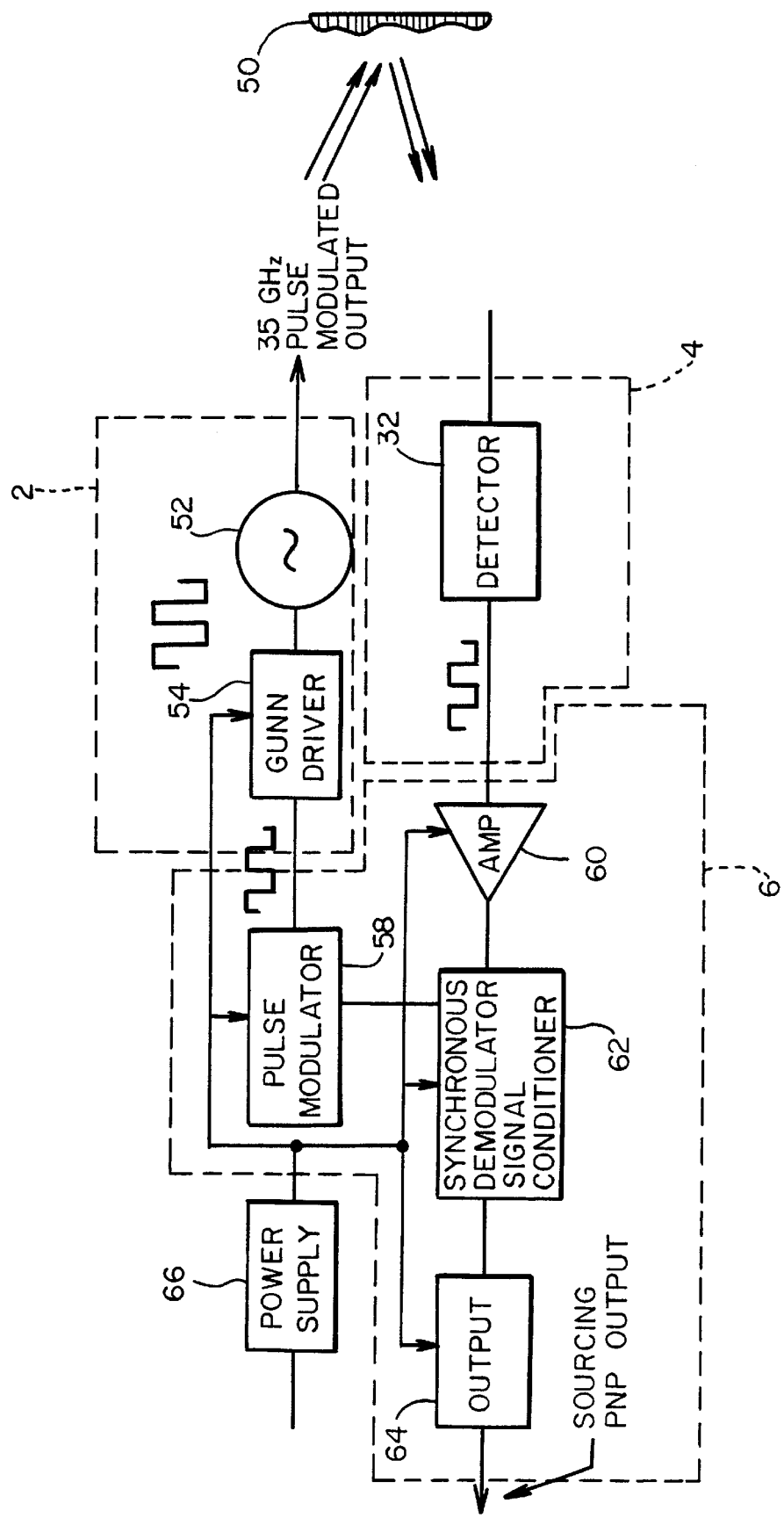
FIG. 11 is a block diagram of another form of the proximity sensor of the present invention.

With regard to the potential for detection nulls (detected output minimums) due to the spatial non-uniformity of the electromagnetic field in the field region near the transmitter output port, such nulls are not a concern as a consequence of the increased detection sensitivity provided by the sensor design shown in FIGS. 11–13. In the previous design (FIGS. 2, 3a and 3b) two receivers were used to avoid detection nulls. The outputs of the two receivers were combined to offset the degradation in detection sensitivity of each receiver due to the lack of transmitter to receiver leakage suppression.

Figure 15:
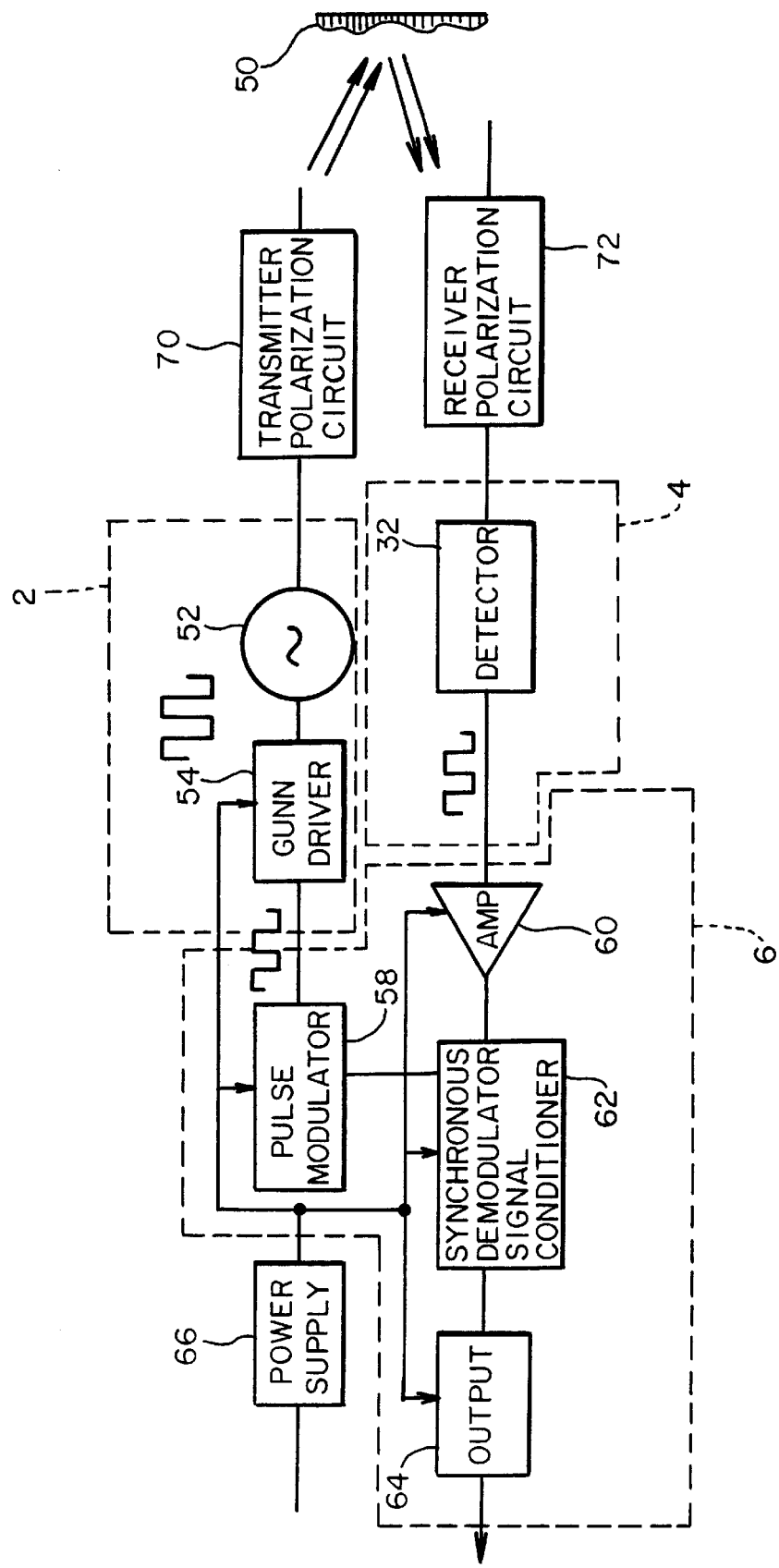
FIG. 15 is a block diagram of yet another form of the proximity sensor of the present invention.
Figure 17:
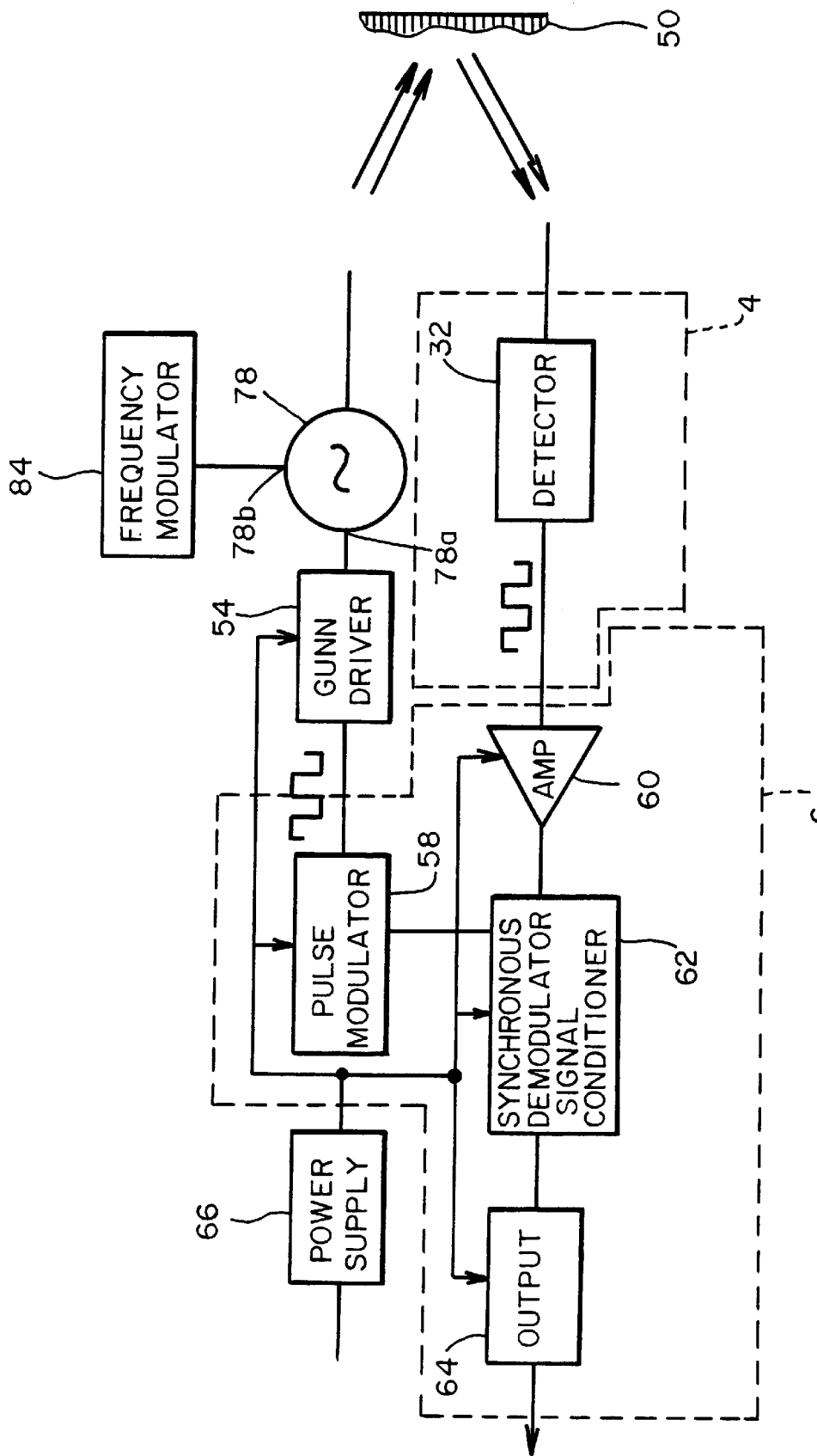
FIG. 17 is a block diagram of still a further form of the proximity sensor of the present invention.
Figure 19:
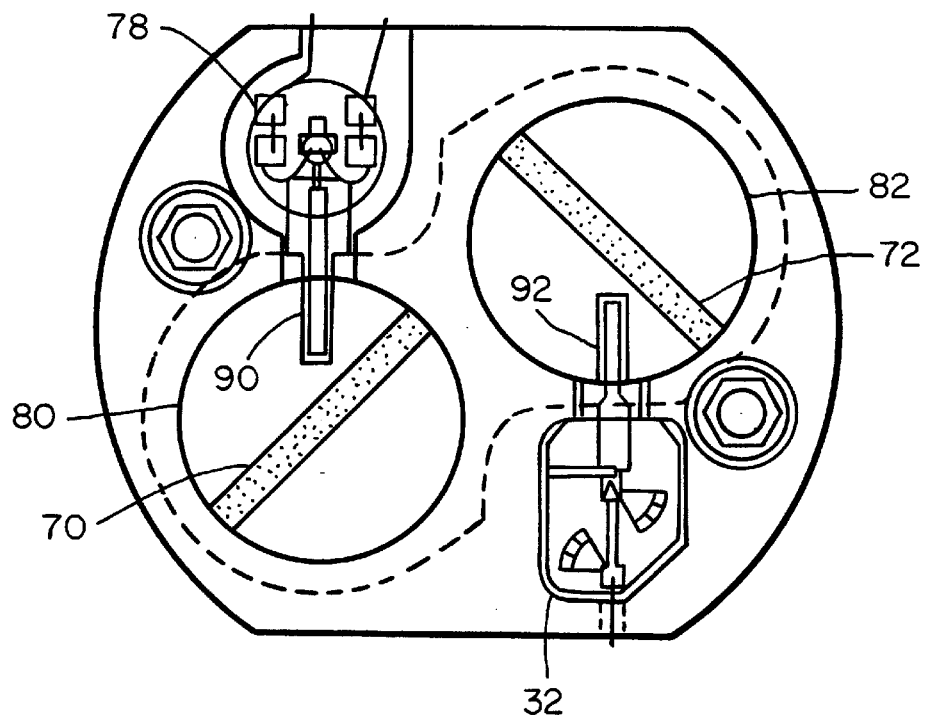
FIG. 19 is a front view of yet another form of the proximity sensor of the present invention, combining the novel features of the proximity sensors respectively depicted in FIGS. 15 and 17.

Still further, it is to be appreciated that other alternative embodiments, which provide increased isolation between the transmitter and receiver, are within the scope of the present invention. Specifically, FIGS. 15 and 17 are block diagrams depicting two alternative forms of the proximity sensor of the present invention providing such increased isolation. FIG. 19 is a front view of another form of the proximity sensor of the present invention which combines the novel features of the sensors respectively depicted in FIGS. 15 and 17.

Figure 14:
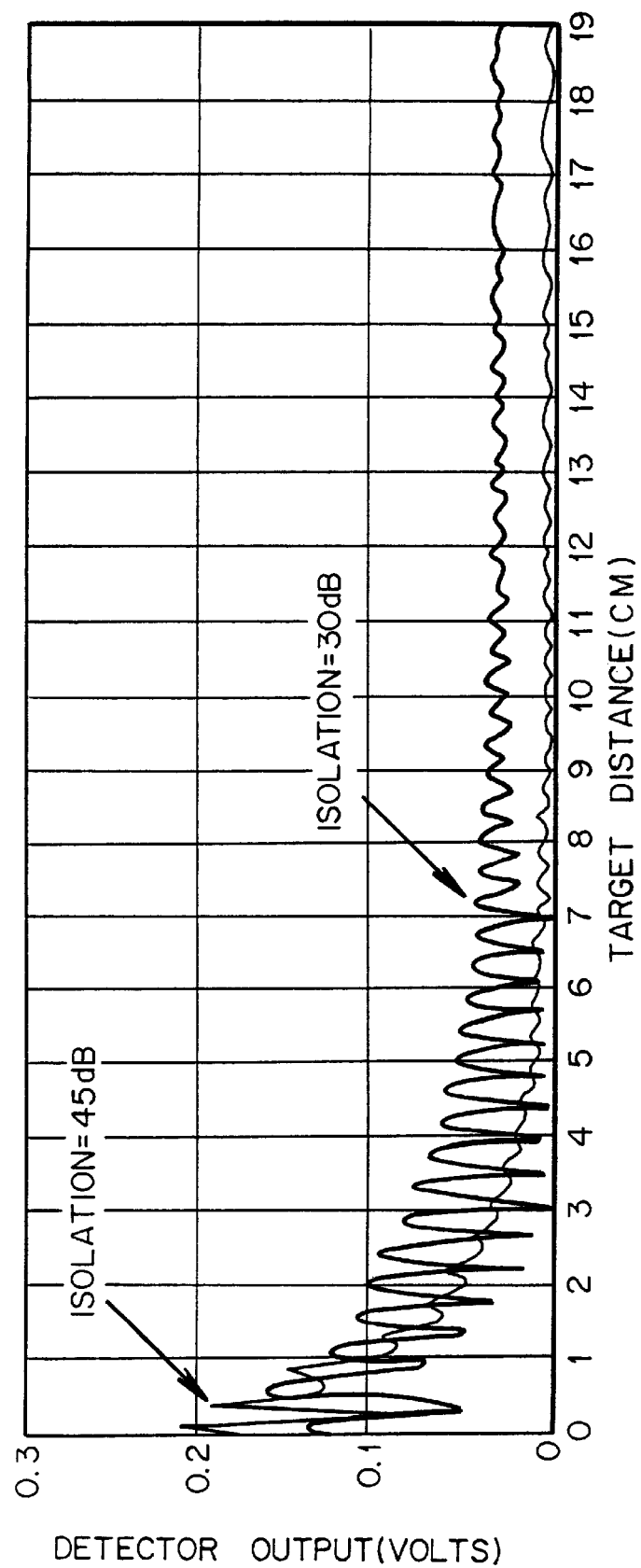
FIG. 14 is a graph of the detector output (volts) versus target distance (centimeters) for a proximity sensor formed in accordance with the present invention.

As previously discussed, poor transmit-to-receive isolation degrades sensor sensitivity and causes interference with the return signal (i.e., signal reflected from the target). The main impact of poor isolation is that it induces a ripple in the detected voltage, as a function of distance between the sensor and the target, due to the constructive and destructive interference of the return signal and the leakage signal (i.e., portion of the signal radiated by the transmitter that leaks into the receiver). It should be appreciated that the constructive and destructive interference of the return signal and leakage signal is a function of their relative phase. A large amount of ripple can cause sensor power-up problems due to the detected voltage dropping below a predetermined sensor acquisition level in the sensing range. Other detrimental effects that a large amount of ripple can cause are null regions and repeatability problems. FIG. 14 is a graph illustrating the detector output of the sensor (i.e., detected voltage) as a function of target distance from the sensor. Specifically, two curves are shown, one curve illustrates the detector output of a sensor having 30 dB of isolation, while the other curve illustrates the same for a sensor having 45 dB of isolation. As is evident from the graph, the sensor having a higher isolation exhibits less ripple with respect to the detector output than that of the sensor with lower isolation and is, therefore, less likely to experience ripple-causing detection problems. It is to be appreciated that the embodiments of the proximity sensor illustrated in FIGS. 15, 17 and 19 implement techniques which serve to substantially minimize the effect of the above-described ripple by increasing the transmit to receive isolation of the sensor.

Referring initially to FIG. 15, the proximity sensor depicted therein implements a novel cross-polarization technique which achieves a substantial improvement in the isolation between the transmitter and the receiver. It is to be appreciated that such isolation improvement increases the detection sensitivity of the proximity sensor. It should also be noted that components illustrated in FIG. 15 having the same reference designation numbers as components illustrated in previously discussed embodiments are functionally the same components. Thus, the electromagnetic wave, reflective type, active proximity sensor of FIG. 15 includes a transmitter for transmitting radiated energy to a target 50. The transmitter includes a Gunn oscillator circuit 2 and a transmitter polarization circuit 70 coupled to the Gunn oscillator circuit 2. The structure of the transmitter polarization circuit will be described in greater detail later. The Gunn oscillator circuit 2 is structurally and functionally the same as the Gunn oscillator circuit described with respect to both FIG. 2 and FIG. 11. The Gunn oscillator circuit 2, itself, includes a Gunn oscillator 52 and a Gunn driver 54 coupled to the Gunn oscillator 52. Although not expressly illustrated in FIG. 15, the transmitter also includes a circular waveguide 80 (FIG. 19) coupled to the Gunn oscillator circuit 2, in which the transmitter polarization circuit 70 is preferably located and from which the radiated energy is transmitted.

The electromagnetic wave proximity sensor illustrated in FIG. 15 also includes a receiver, the receiver including a receiver polarization circuit 72 and a detector 32 coupled to the receiver polarization circuit 72. The structure of the receiver polarization circuit will be described in greater detail later. Similar to the transmitter, although not expressly illustrated in FIG. 15, the receiver also includes a circular waveguide 82 (FIG. 19) coupled to the detector 32, in which the receiver polarization circuit 72 is preferably located and by which the radiated energy reflected from the target 50 is received. Further, the proximity sensor of FIG. 15 includes an analog processor/driver circuit 6. The analog processor/driver circuit 6 is structurally and functionally the same circuit as was previously described with respect to the proximity sensor embodiments depicted in FIGS. 2 and 11. Thus, the analog processor/driver circuit 6 includes an amplifier 60 coupled to the detector 32 of the receiver, a synchronous demodulator signal conditioner 62 coupled to the amplifier 60, and an output stage 64 coupled to the synchronous demodulator signal conditioner 62. As previously described, the analog processor/driver circuit 6 also includes a pulse modulator 58 coupled to both the synchronous demodulator signal conditioner 62 and the Gunn driver 54 of the transmitter. Power supply 66 is connected to the various components of the sensor and provides the necessary input power to each of the above-described components which require the same.

Accordingly, the electromagnetic wave proximity sensor illustrated in FIG. 15 operates in the following manner. The pulse modulator 58 generates a pulsed signal and provides the pulsed signal to the Gunn driver 54. The Gunn oscillator 52, in response to being driven by the Gunn driver 54, generates a pulse modulated signal. Next, the circular waveguide 80, coupled to the Gunn oscillator circuit 2, propagates the pulse modulated signal to the transmitter polarization circuit 70 preferably located in the circular waveguide 80. It is to be understood that the pulse modulated signal generated by the Gunn oscillator circuit 2 is a linearly polarized signal. The transmitter polarization circuit 70 circularly polarizes the pulse modulated signal such that the signal rotates in a first circular direction. The first circular direction may be either a clockwise or a counter-clockwise rotation. The circularly polarized, pulse modulated signal is then radiated from the circular waveguide 80 toward the target 50, whereby the signal strikes the target 50 and reflects back toward the proximity sensor. Significantly, upon striking the target 50, the signal changes its rotational sense and rotates in a second circular direction. The second circular direction is opposite to the rotational sense of the first circular direction and, thus, may be either a clockwise or counter-clockwise rotation.

Next, the circular waveguide 82 of the receiver receives the radiated energy reflected from the target 50 in the form of the circularly polarized, pulse modulated signal rotating in the second circular direction. Preferably, the receiver polarization circuit 72 is located in the circular waveguide 82 and its preferred structure will be described later in greater detail. The receiver polarization circuit 72 is responsive to the circularly polarized, pulse modulated signal rotating in a second circular direction and removes the circular polarization associated therewith. It is to be appreciated that the receiver of the embodiment illustrated in FIG. 15 is responsive only to signals which are polarized in the same rotational sense as the receiver polarization circuit 72 (i.e., in the second circular direction). Thus, the return signal, after being circularly de-polarized, is passed from the receiver polarization circuit 72 to the detector 32 by the circular waveguide 82. The detector 32 generates an output signal which corresponds to the radiated energy reflected back from the target 50 in the form of the circularly polarized, pulse modulated signal rotating in a second circular direction (i.e., the return signal).

The analog processor/driver circuit 6 is responsive to the output signal generated by the detector 32. Specifically, the amplifier 60 of the analog processor/driver circuit 6 receives the output signal of the detector 32 and generates an amplified signal in response thereto. Next, the synchronous demodulator signal conditioner 62 receives the amplified signal and, in response thereto, generates its own output signal. The output signal generated by the synchronous demodulator signal conditioner 62 is then received by the output stage 64 and, in response thereto, the output stage 64 generates an output signal. As previously discussed with respect to the above-described embodiments of the present invention, the output stage 64 preferably provides a TTL pulsed output signal (or some other logic compatible format) such that the proximity sensor may be properly interfaced with external circuitry. Also, as previously mentioned, Eaton Corporation Part No. 109905 may be used as the output stage 64 illustrated in FIG. 15, while the rest of the analog processor/driver 6 may be Eaton Corporation Part No. 109744.

Figure 16A:
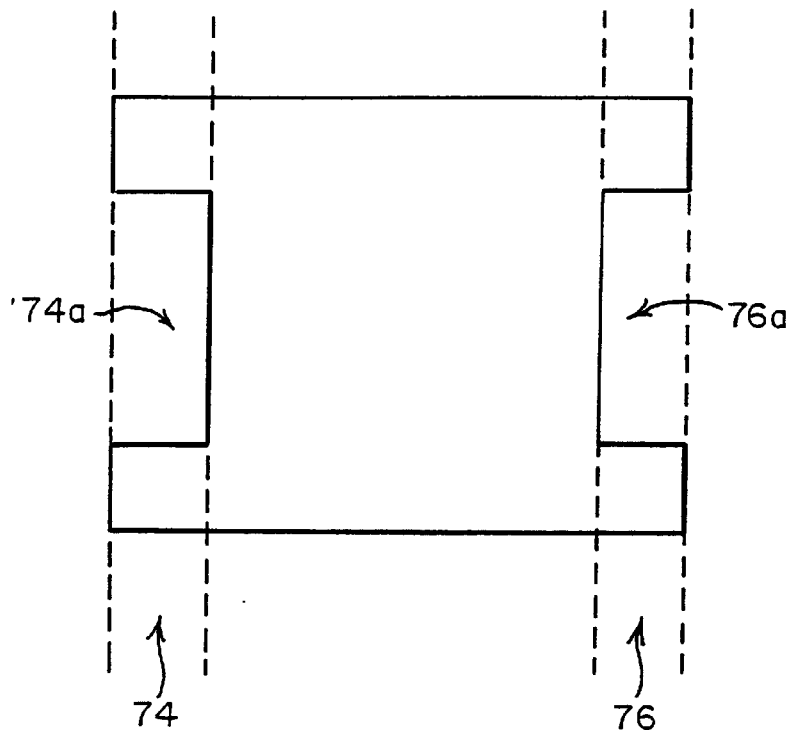
FIG. 16a is a side view of one embodiment of the dielectric card utilized in the polarization circuit of the present invention.

The preferred structure and function of the transmitter polarization circuit 70 and the receiver polarization circuit 72 will now be described. The transmitter polarization circuit 70 preferably includes a thin dielectric card (injection molded Nylon 6/6) of a predetermined length which is inserted into the circular waveguide 80 at a 45 degree angle relative to the dominant mode electric field of the signal generated by the Gunn oscillator circuit 2. FIG. 16a is a side view of a preferred embodiment of the dielectric card, which will be described in greater detail later. The electric field associated with the pulse modulated signal generated by the Gunn oscillator circuit 2, which is present in the circular waveguide 80, can be decomposed into two orthogonal components, one which is perpendicular to the dielectric card and the other which is parallel to the dielectric card. If the length of the dielectric card is selected such that the parallel field component experiences a 90 degree phase shift relative to the perpendicular field component, the entire electric field will rotate in a circular manner. Accordingly, in this manner, the signal is circularly polarized. It should also be appreciated that if the dielectric card is placed in the circular waveguide 80 at the opposite 45 degree angle relative to the electric field, the entire electric field will rotate in the opposite direction and, therefore, have an opposite circular polarization as compared to that of the field circularly polarized by the dielectric card inserted in the initially-described position.

The dielectric card illustrated in FIG. 16a preferably includes a first matching section 74 and a second matching section 76, whose functions will now be described. It should be noted that the matching sections, 74 and 76, illustrated in FIG. 16a are included in order to respectively reduce signal reflection due to the difference between the dielectric constant associated with the material used to produce the dielectric card and the dielectric constant associated with free space. With respect to the dielectric card inserted into the circular waveguide 80 of the transmitter, the first matching section 74 provides an intermediate dielectric constant which presents more of a gradual transition, between free space and the dielectric material, for the pulse modulated signal propagating through the circular waveguide 80. The intermediate dielectric constant is provided by notching the dielectric card in the manner illustrated in FIG. 16a, thus producing cutout 74a. Likewise, the second matching section 76 includes cutout 76a which similarly provides for a more gradual transition for the propagating signal.

Similarly, the receiver polarization circuit 72 includes the same dielectric card as described with respect to the transmitter polarization circuit 70 and as illustrated in FIG. 16a. The dielectric card of the receiver polarization circuit 72 is inserted into the circular waveguide 82 at a 45 degree angle which is opposite (90 degrees offset) to the 45 degree angle of the dielectric card inserted in the circular waveguide 80 of the transmitter. Accordingly, the circular waveguides of the transmitter and the receiver, 80 and 82, are oppositely polarized and are, therefore, said to be cross-polarized. Also, similar to the dielectric card in the transmitter circular waveguide 80, the dielectric card inserted in the receiver waveguide 82 utilizes the first and second matching sections, 74 and 76, to reduce reflection and provide a gradual transition for the signal passing therethrough.

Figure 16C:
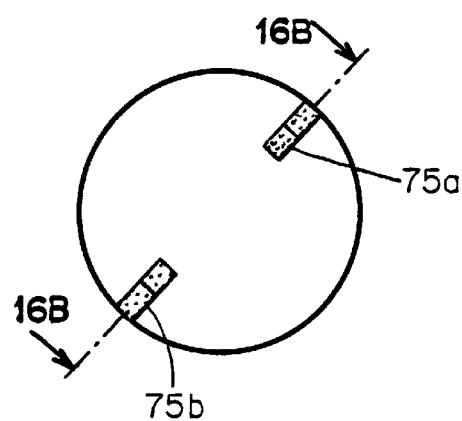
FIG. 16c is a front view of the same embodiment of the polarization circuit illustrated in FIG. 16b.
Figure 16B:
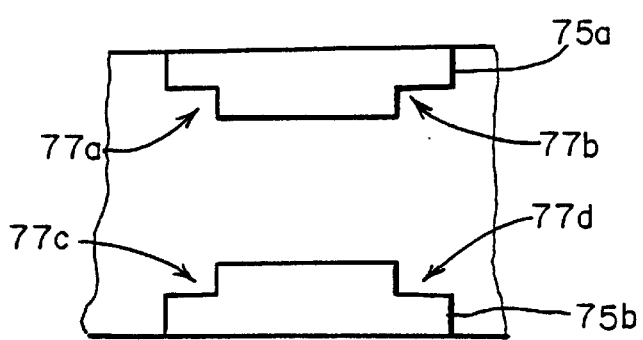
FIG. 16b is a cross sectional side view of another embodiment of the polarization circuit of the present invention.

It is to be appreciated that the present invention encompasses alternative forms of the transmitter and receiver polarization circuit 70 and 72. Particularly, the dielectric card described above may be integrally formed with a dielectric cover (i.e., single piece), similar to the dielectric cover 7 (FIG. 3b), which respectively fits over the openings of the circular waveguides. Also, the polarization circuit may be implemented as illustrated in FIGS. 16b and 16c. FIGS. 16b and 16c respectively illustrate a cross sectional side view and a front view of another embodiment of the polarization circuit whereby dielectric fins 75a and 75b are preferably integrally formed on the inner surface of the circular waveguides. FIG. 16b is a cross sectional side view taken along the line 16b—16b shown in FIG. 16c. The dielectric fins, 75a and 75b, are positioned at a 45 degree angle relative to the dominant mode electric field as described above with respect to the dielectric card. It is to be appreciated that FIGS. 16b and 16c illustrate only one of the circular waveguides and that the other circular waveguide will have similarly formed dielectric fins that are positioned 90 degrees offset from the first waveguide in a similar manner as described with respect to the dielectric cards. The dielectric fins 75a and 75b extend into the waveguide approximately less than one third of the inner diameter of the waveguide. It is to be appreciated that these dielectric fins, also referred to as one quarter wavelength plates, have cutouts 77a, b, c and d, similar to the cutouts, 74a and 76a, illustrated in FIG. 16a. Cutouts 77a–d provide a similar matching function as described above. Also, the circular polarization of a signal passing through a polarization circuit as depicted in FIGS. 16b and 16c is accomplished in the same way as described above with respect to the dielectric card. Still further, it is to be understood that the above described embodiments of the polarization circuit of the present invention may also be implemented in a square waveguide, rather than a circular waveguide.

The significance of this novel cross-polarization technique employed by the present invention is realized in improved transmitter-to-receiver isolation. Since the transmitter is radiating an output signal that is circularly polarized (rotating) in a first circular direction, and since that output signal will reverse its rotational sense upon being reflected from the target and thereby rotate in a second circular direction, by polarizing the receiver such that it is responsive only to signals rotating in the second circular direction, the receiver will be substantially immune to radiated energy that would ordinarily leak into the receiver from the transmitter. Thus, due to this cross-polarization technique implemented between the transmitter and receiver, the isolation of the proximity sensor is increased by approximately 20 dB to 25 dB, thus resulting in a minimum isolation of approximately 45 dB (i.e., without the need for any special or critical alignment). Accordingly, such a proximity sensor formed in accordance with the present invention will be less likely to experience the ripple-causing detection problems previously discussed. Further, this cross-polarization technique is not frequency sensitive since the polarization circuits, 70 and 72, are operable over the entire operational frequency bandwidth of the proximity sensor contemplated by the present invention.

Referring now to FIG. 17, another alternative form of the present invention, employing a frequency modulation technique, is illustrated therein. It should be appreciated that the embodiment of the present invention illustrated in FIG. 17 is structurally the same as the embodiment illustrated in FIGS. 11, 12a and 12b, with the exception of the transmitter. In place of the Gunn oscillator 52 (FIG. 11), a Gunn voltage controlled oscillator (VCO) 78 is employed. The Gunn VCO 78 includes a bias port 78a and a tuning port 78b. The Gunn driver 54 is coupled to the bias port 78a of the Gunn VCO 78, while a frequency modulator 84 is coupled to the tuning port 78b of the Gunn VCO 78. The remainder of the components of the sensor depicted in FIG. 17 are the same, and interconnected in the same manner, as was previously described with respect to the sensor depicted in FIGS. 11, 12a and 12b. Thus, although not illustrated in FIG. 17, the transmitter includes waveguide 34 (FIG. 12a) and the receiver includes waveguide 30 (FIG. 12a).

The frequency modulation technique described in the context of the sensor depicted in FIG. 17 provides a significant improvement in isolation between the transmitter and the receiver. The concept behind this novel frequency modulation technique is that the phase of the return signal (i.e., signal reflected from the target) relative to the leakage signal can be changed, at a specific distance from the sensor, without physically moving the target or sensor. This is accomplished in the present invention by shifting the frequency of the oscillator of the transmitter in a particular manner that will be described later. For instance, if at some distance R from the sensor the return signal is 180 degrees out of phase with the leakage signal, then the detected voltage will be at a minima. If the sensor output frequency is shifted such that the return signal is in phase with the leakage signal, then the detected voltage at the same distance R will be at a maxima. Since the phase of the return signal obeys an $e^{-2jkr}$ dependence, where j equals $\sqrt{-1}$, k equals the freespace wave propagation constant in $mm^{-1}$ and r equals the distance from the transmitter to the target in mm, it can be seen from this relationship that the phase cycles at a rate of 2r, due to the round trip path (i.e., from the sensor to the target and back to the sensor) and, therefore, one quarter wavelength of distance results in a 180 degree shift in phase.

Figure 18A:
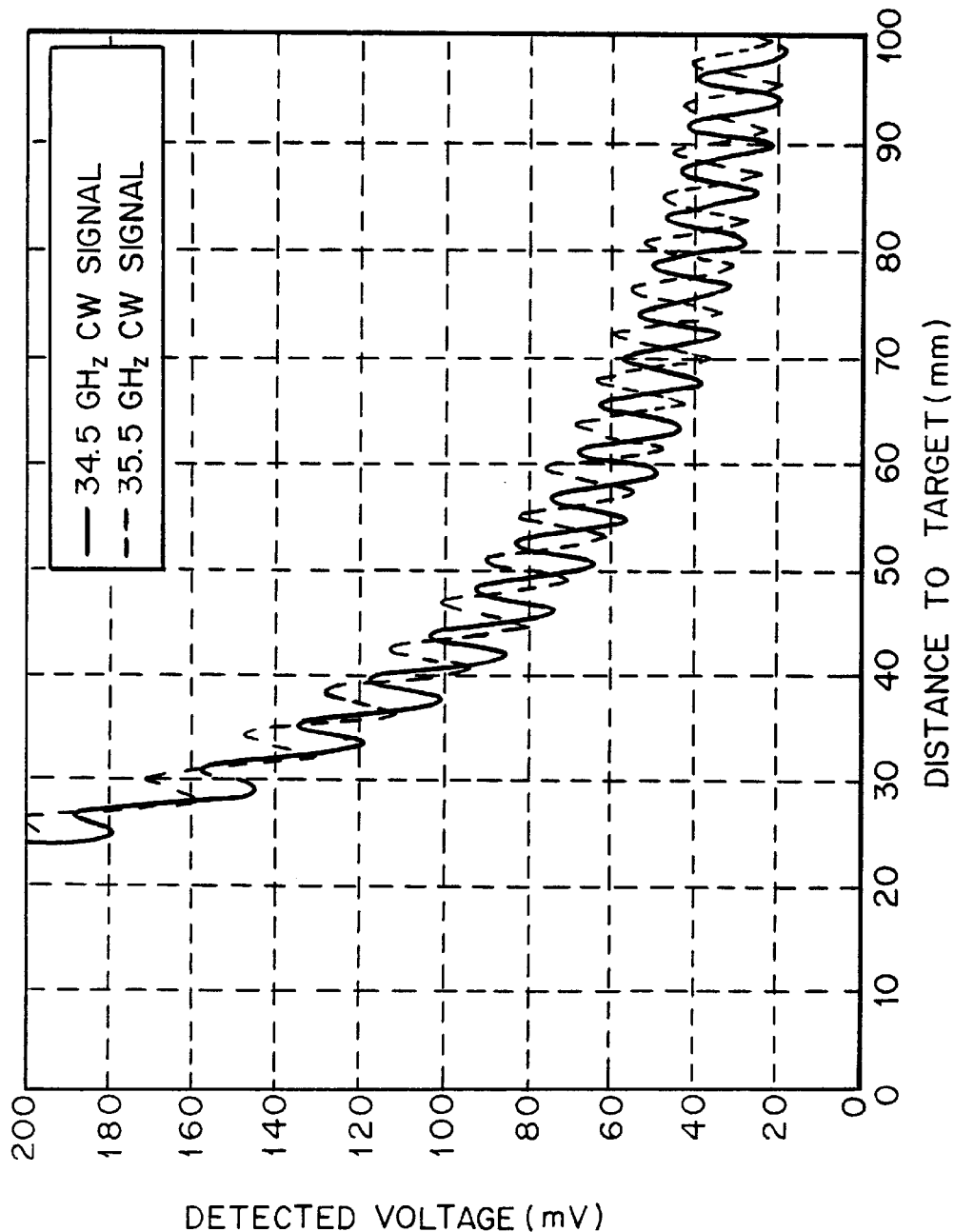
FIGS. 18a, 18b and 18c are graphs of the detected voltage (millivolts) versus the distance to the target (millimeters) for respective embodiments of the present invention.

The frequency deviation required to shift the return signal phase by 180 degrees corresponds to the frequency at which the target distance is equal to one quarter wavelength. Thus, the frequency deviation can be determined from the relationship:

$$\delta F = c/4R$$

where c is equal to the speed of light in air ($3 \times 10^{11}$ mm/sec) and R is the distance between the sensor and the target in millimeters (mm). For example, assuming a separation of 75 mm between the sensor and the target, a 1 GHz shift in frequency will result in a 180 degree phase shift in the return signal. FIG. 18a is a graph representing the respective theoretical responses of a proximity sensor of the present invention at two frequencies, 34.5 GHz and 35.5 GHz, that are separated by 1 GHz. As is evident from the graph, the two signals are 180 degrees out of phase with each other at 75 mm.

Referring again to the embodiment of the sensor depicted in FIG. 17, the Gunn driver 54, coupled to the bias port 78a of the Gunn VCO 78, generates a signal which biases (i.e., turns on and off) the Gunn VCO 78. In addition, the frequency modulator 84, coupled to the tuning port 78b of the Gunn VCO 78, provides a modulating signal to the Gunn VCO 78. The Gunn VCO 78 generates an output signal in response to the Gunn driver 54 and the frequency modulator 84. The frequency of the output signal generated by the Gunn VCO 78 is proportional to the value of the voltage applied to the tuning port 78b. Thus, the output signal of the Gunn VCO 78 will be a function of the modulating signal provided by the frequency modulator 84 and, thus, a frequency varying output signal. It is to be appreciated that the Gunn VCO 78, in a preferred embodiment, is a lumped element VCO and is varactor-tuned over a frequency range of 32 GHz to 38 GHz, providing a nominal output power of +5 dBm.

Thus, if the frequency of the output signal of the Gunn VCO 78 is modulated between two discrete frequencies (i.e., frequency shift key (FSK) modulation) at a rate that is substantially faster (e.g. ten times) than the video bandwidth of the detector 32, the detector 32 can only respond to the average of the two detected waveforms, i.e., one detected waveform being attributed to a return signal reflected from the target exhibiting the first discrete frequency and the other detected waveform being attributed to a return signal reflected from the target exhibiting the second discrete frequency. Therefore, over a small range encompassing the distance where the two return signals are 180 degrees out of phase with each other, the output signal generated by the detector 32 will exhibit substantially no ripple. FSK modulation of the Gunn VCO output signal can be accomplished by applying a square wave signal, generated by the frequency modulator 84, to the tuning port 78b of the Gunn VCO 78.

Figure 18B:
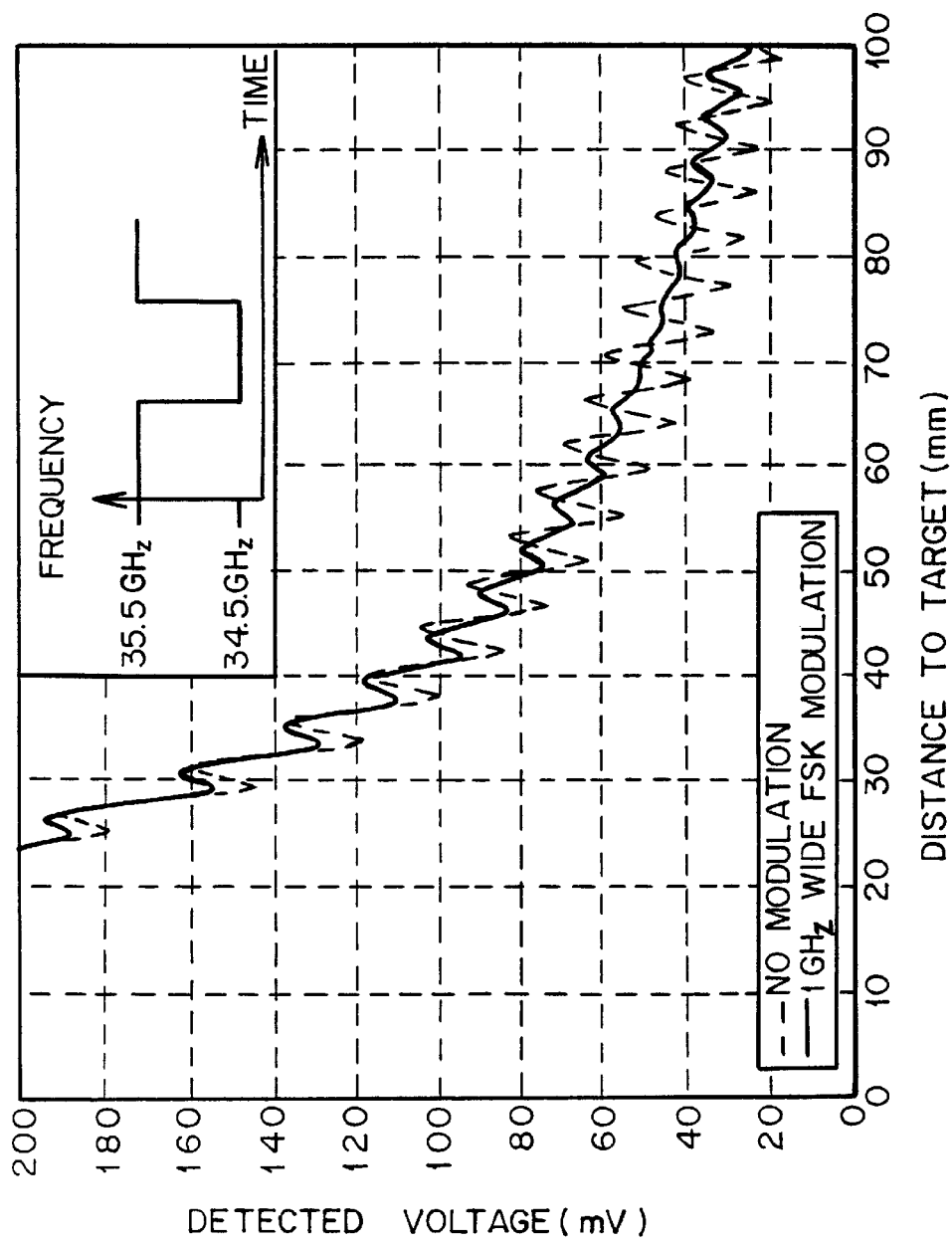

FIG. 18b is a graph representing the theoretical response of a proximity sensor of the present invention whose transmitted signal is FSK modulated over a frequency deviation of 1 GHz (34.5 GHz and 35.5 GHz). A curve illustrating a response without FSK modulation is also included for comparison. As can be seen in the graph of FIG. 18b, the detector 32 does in fact respond to the average value of the two return signals as evidenced by the substantially flat (i.e., substantially ripple free) region around 75 mm. It should be understood that the substantially flat region will repeat itself at each distance interval that corresponds to an odd multiple of quarter wavelengths of the deviation frequency. Further, it should be appreciated that the distance where substantially no ripple occurs can be precisely controlled, in accordance with the present invention, by selecting the appropriate frequency deviation.

Figure 12B:
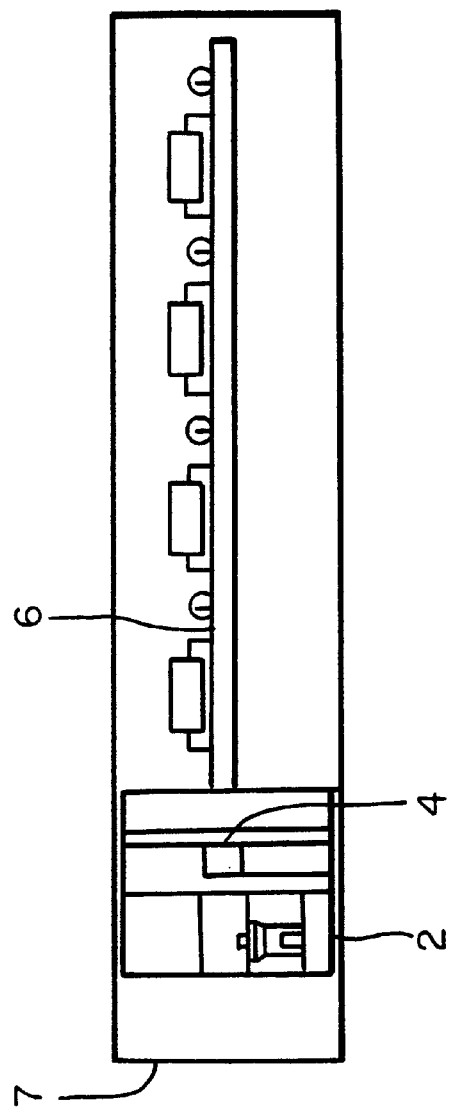
FIG. 12b is a side view of the form of the proximity sensor shown in FIG. 11.
Figure 12A:
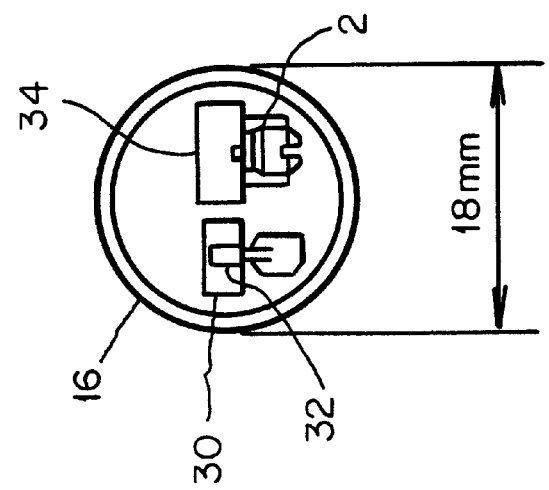
FIG. 12a is an end view of the form of the proximity sensor shown in FIG. 11.

Lastly, the remainder of the processing of the output signal generated by the detector 32 is exactly the same as that applied to the output signal generated by the detector 32 of the sensor depicted in FIGS. 11, 12a and 12b. Specifically, the analog processor/driver circuit 6 is responsive to the output signal generated by the detector 32, whereby the amplifier 60 receives the output signal of the detector 32 and generates an amplified signal in response thereto. Next, the synchronous demodulator signal conditioner 62 receives the amplified signal and, in response thereto, generates an output signal. The output signal generated by the synchronous demodulator signal conditioner 62 is then received by the output stage 64 and, in response thereto, the output stage 64 generates an output signal in a format compatible with external circuitry. Again, as previously mentioned, Eaton Corporation Part No. 109905 may be used as the output stage 64 illustrated in FIG. 17, while the rest of the analog processor/driver 6 may be Eaton Corporation Part No. 109744.

Figure 18C:
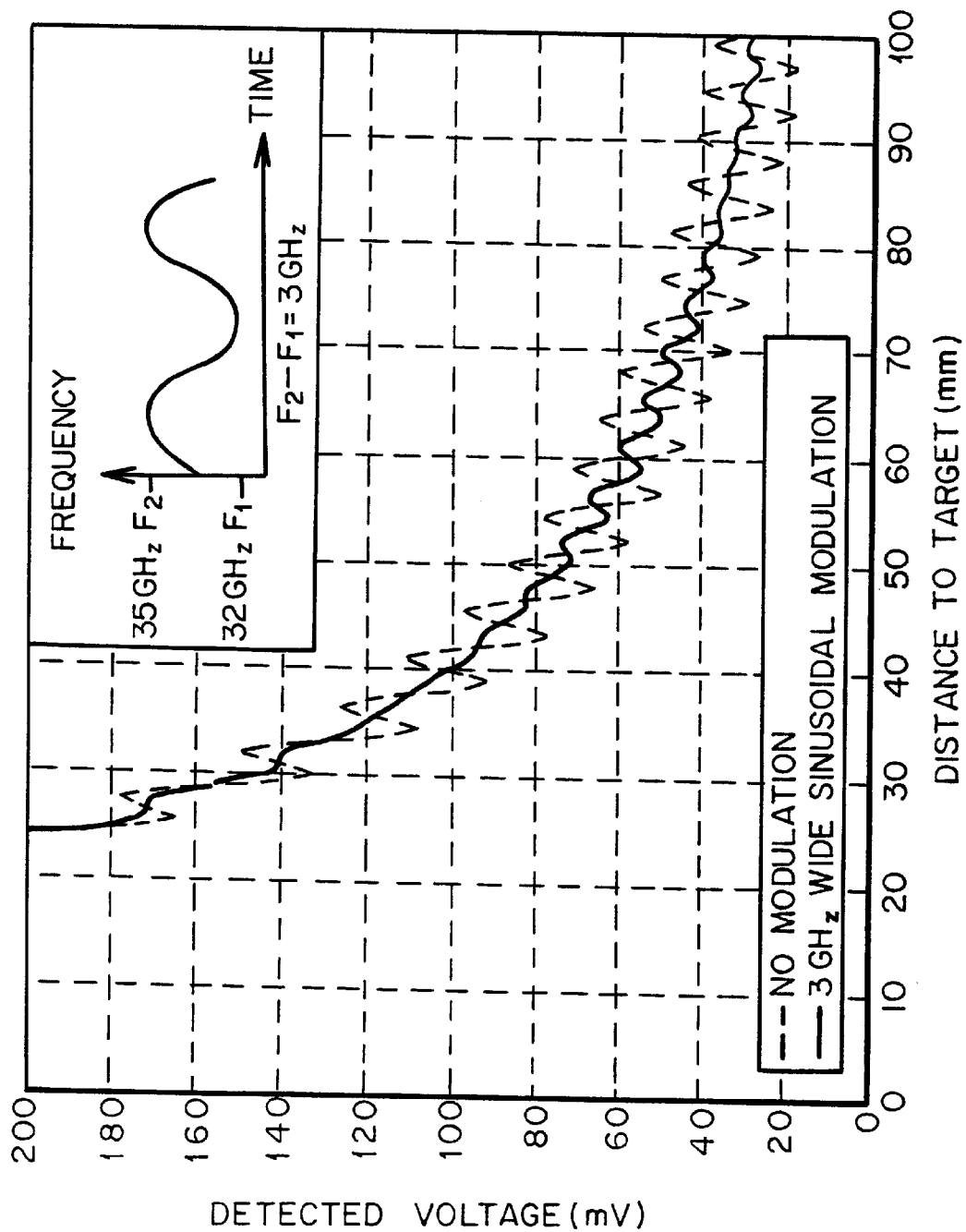

Still referring to the embodiment of the sensor depicted in FIG. 17, it is to be appreciated that if the output signal of the Gunn VCO 78 is modulated over a broad range of frequencies, rather than just two discrete frequencies as described above, then the detector 32 will average the detected waveforms over the entire range of the frequency output spectrum. It should be understood that the weighting at each frequency will be proportional to the shape of the modulation waveform and is determined by how much of the transmitted pulse is occupied by a particular frequency deviation. This results in the averaging of a continuum of phase shifts at each distance and, thus, can provide lower ripple over broader regions of the sensing distance. For example, FIG. 18c is a graph representing the theoretical response of a proximity sensor of the present invention whose transmitted signal is sinusoidally modulated over a deviation frequency bandwidth of 3 GHz (i.e., from 32 GHz to 35 GHz). A curve illustrating a response without any modulation (i.e., continuous wave (CW) operation at 35 GHz) is also included for comparison. As is evident from the curve illustrating the frequency modulation technique, the ripple is significantly reduced over an appreciable portion of the proximity sensor's preferred sensing distance of 0 to 80 mm. Thus, this novel frequency modulation technique serves to significantly reduce the ripple over a predictable, controllable and appreciable portion of the sensing range of the proximity sensor, thereby resulting in an effective increase of the sensor transmit-to-receive isolation by more than 15 dB. It is to be appreciated that other modulation shapes such as sawtooth or triangular waves may result in more optimum performance as compared to the sinusoidal modulation approach.

Referring now to FIG. 19, yet another embodiment of the electromagnetic wave proximity sensor, formed in accordance with the present invention, is illustrated. It is to be appreciated that this particular embodiment combines the cross-polarization technique employed in the proximity sensor illustrated in FIG. 15 and the frequency modulation technique employed in the proximity sensor illustrated in FIG. 17. Specifically, FIG. 19 is a front view (i.e., looking into the face of the sensor) of such a proximity sensor.

It is to be understood that all of the components illustrated in FIG. 17 are included in the combined embodiment of FIG. 19; however, the transmitter waveguide 34 employed in the sensor of FIG. 17 is replaced with the transmitter circular waveguide 80 (FIG. 15) which also includes the transmitter polarization circuit 70 (i.e., dielectric card illustrated in FIG. 16). Likewise, the receiver waveguide 30 employed in the sensor of FIG. 17 is replaced with the receiver circular waveguide 82 (FIG. 15) which also includes the receiver polarization circuit 82 (i.e., dielectric card illustrated in FIG. 16). Accordingly, the output signal generated by the Gunn VCO 78 is both frequency modulated and circularly polarized in the novel manners previously described. Also, it is to be understood that the circular waveguide 80, in a preferred embodiment, is designed to pass only the second harmonic of the signal generated by the Gunn VCO 78, e.g., if the signal generated has a fundamental frequency range of 27 GHz to 32 GHz, then the transmitted signal will exhibit a second harmonic frequency range of 54 GHz to 64 GHz.

Figure 20:
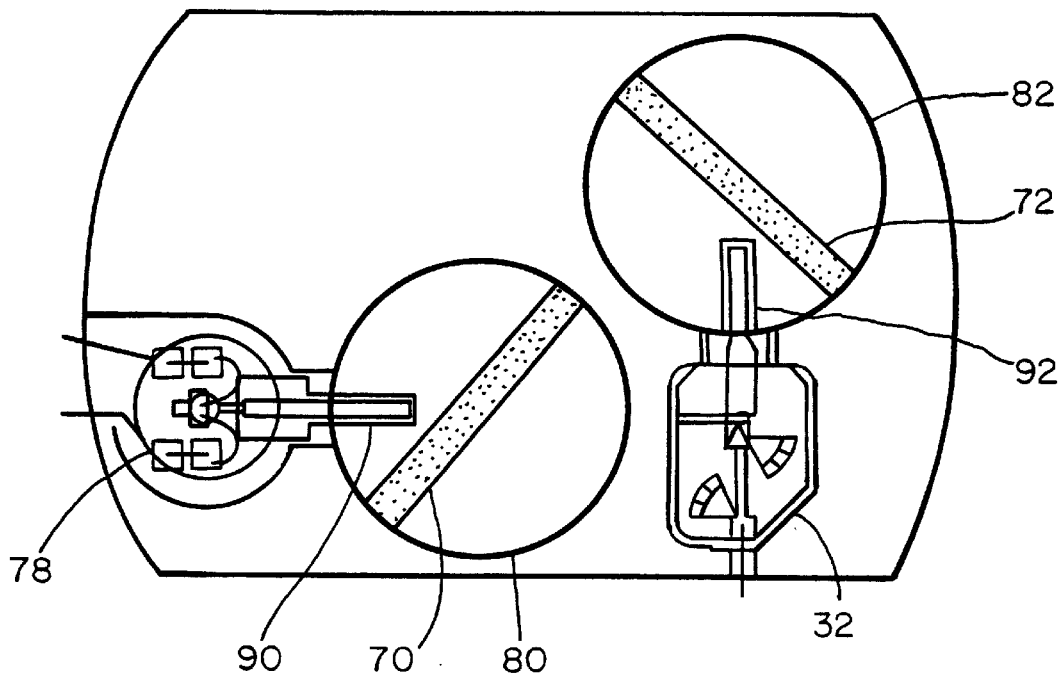
FIG. 20 is a front view of still a further form of the proximity sensor of the present invention.

Still further, FIG. 19 illustrates a transmitter E-plane (i.e., electric field) probe 90. The E-plane probe 90 transforms the mode of the signal generated by the Gunn VCO 78 (i.e., microstrip mode) to waveguide mode such that the signal may be propagated through the circular waveguide 80 to the polarization circuit 70. Likewise, FIG. 19 also illustrates a receiver E-plane probe 92. The E-plane probe 92 transforms the return signals received by the circular waveguide 82 from waveguide mode to microstrip mode such that the detector 32 may process the return signals. FIG. 19 illustrates the E-plane probes, 90 and 92, 180 degrees offset from one another. As previously mentioned, the signal generated by the Gunn VCO 78 is a linearly polarized signal prior to being circularly polarized by the transmitter polarization circuit 70. Likewise, the return signal becomes a linearly polarized signal after passing through the receiver polarization circuit 72. Referring now to FIG. 20, it is to be appreciated that by orthogonally positioning (i.e., 90 degree offset) the transmitter E-plane probe 90 in the transmitter circular waveguide 80, relative to the receiver E-plane probe 92, any portion of the linearly polarized signal generated by the Gunn VCO 78 which leaks past the transmitter polarization circuit 70 and past the receiver polarization circuit 72 will not be detected by the detector 32 of the receiver. Accordingly, by such positioning of the E-plane probes, 90 and 92, at a 90 degree angle with respect to each other as shown in FIG. 20, an additional 20 dB in isolation may be realized. It should also be understood that the orthogonally disposed E-plane probes, 90 and 92, should preferably be approximately one quarter wavelength long in order to achieve the above-described additional isolation.

Thus, the proximity sensor, as depicted in FIG. 19 and FIG. 20, by employing the above-described cross-polarization and frequency modulation techniques in accordance with the present invention, may advantageously provide effective transmitter-to-receiver isolation in excess of 50 to 55 dB over the desired sensing range.

Further, while the particular embodiments of the receiver of the present invention, discussed herein, refer to a direct detection technique of detecting the reflected signal, it is to be understood that the receiver may be in the form of a homodyne mixer whereby the received signal is actually mixed with a delayed version of itself.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An electromagnetic wave, reflective type, active proximity sensor, which comprises:
   a transmitter for transmitting radiated energy to a target, the transmitter including an oscillator circuit, the oscillator circuit generating a signal which is radiated by the transmitter to the target; and
   a receiver, the receiver including first and second waveguides and first and second detectors respectively coupled to the first and second waveguides, the first and second waveguides receiving radiated energy reflected from the target and providing the radiated energy to the first and second detectors, respectively, each of the first and second detectors generating an output signal which corresponds to the radiated energy received by the first and second waveguides, the receiver further including a summer, the summer being coupled to the first and second detectors and being responsive to the output signals of the first and second detectors, the summer generating an output signal corresponding to the sum of the output signals of the first and second detectors;
   wherein the first and second waveguides are positioned with respect to each other in different spatial locations in order to substantially provide that at least one of the first and second detectors, respectively coupled to the first and second waveguides, will detect a portion of the radiated energy reflected from the target; and
   wherein the first and second waveguides of the receiver are positioned to have different Z coordinates with respect to each other.

2. An electromagnetic wave, reflective type, active proximity sensor, which comprises
   a transmitter for transmitting radiated energy to a target, the transmitter including an oscillator circuit, the oscillator circuit generating a signal which is radiated by the transmitter to the target; and
   a receiver, the receiver including first and second waveguides and first and second detectors respectively coupled to the first and second waveguides, the first and second waveguides receiving radiated energy reflected from the target and providing the radiated energy to the first and second detectors respectively each of the first and second detectors generating an output signal which corresponds to the radiated energy received by the first and second waveguides, the receiver further including a summer, the summer being coupled to the first and second detectors and being responsive to the output signals of the first and second detectors, the summer generating an output signal corresponding to the sum of the output signals of the first and second detectors;
   wherein the first and second waveguides are positioned with respect to each other in different spatial locations in order to substantially provide that at least one of the first and second detectors, respectively coupled to the first and second waveguides, will detect a portion of the radiated energy reflected from the target; and
   wherein the first and second waveguides of the receiver are positioned to have the same Z coordinate with respect to each other, while the transmitter is positioned to have a different Z coordinate than the first and second waveguides.

3. An electromagnetic wave, reflective type, active proximity sensor which comprises:
   a transmitter for transmitting radiated energy to a target, the transmitter including a voltage controlled oscillator circuit, the voltage controlled oscillator circuit generating an output signal, the output signal being modulated such that the frequency of the output signal varies over time between a range of frequencies;
   a first circular waveguide, the first circular waveguide being coupled to the voltage controlled oscillator circuit and propagating the frequency varying, output signal generated by the voltage controlled oscillator circuit;

a first polarization circuit, the first polarization circuit being coupled to the first circular waveguide, the first polarization circuit circularly polarizing, in a first circular direction, the frequency varying output signal generated by the voltage controlled oscillator circuit and propagated by the first circular waveguide, the circularly polarized, frequency varying, output signal being radiated by the transmitter, striking the target and reflecting back toward the proximity sensor to form return signals, the return signals rotating in a second circular direction opposite to the first circular direction;

a receiver, the receiver including a second circular waveguide, the second circular waveguide receiving the return signals reflected from the target;

a second polarization circuit, the second polarization circuit being coupled to the second circular waveguide and being responsive to signals polarized in the second circular direction; and a detector, the detector receiving the return signals from the second polarization circuit and generating an output signal which corresponds to the return signals.

4. An electromagnetic wave, reflective type, active proximity sensor as defined in claim 3, wherein the voltage controlled oscillator circuit discretely varies the output signal generated by the transmitter between at least two frequencies.

5. An electromagnetic wave, reflective type, active proximity sensor as defined in claim 3, wherein the voltage controlled oscillator circuit sinusoidally varies the output signal generated by the transmitter between at least two frequencies.

6. An electromagnetic wave, reflective type, active proximity sensor as defined in claim 3, wherein the transmitter further includes a transmitter probe, the transmitter probe being positioned within the first circular wave guide, the transmitter probe transforming the frequency varying, output signal generated by the voltage controlled oscillator circuit from a first signal mode to a second signal mode, the second signal mode being appropriate for propagating the frequency varying, output signal through the first circular waveguide, and wherein the receiver further includes a receiver probe, the receiver probe being positioned within the second circular wave guide, the receiver probe transforming the return signals reflected from the target from a first signal mode to a second signal mode, the second signal mode being appropriate for presenting the return signals to the detector, the transmitter probe being orthogonally positioned in the first circular waveguide of the transmitter relative to the position of the receiver probe positioned in the second circular wave guide of the receiver.

7. An electromagnetic wave, reflective type, active proximity sensor which comprises:

a transmitter for transmitting radiated energy to a target, the transmitter including a voltage controlled oscillator circuit, the voltage controlled oscillator circuit generating an output signal, the output signal being modulated such that the frequency of the output signal varies over time between a range of frequencies, the frequency varying, output signal being radiated by the transmitter to the target; and a receiver, the receiver receiving return signals, the return signals corresponding to the radiated energy reflected from the target, the receiver including a detector, the detector averaging the return signals and generating an output signal which corresponds to the return signals, wherein a portion of the signal radiated by the transmitter to the target is received by the receiver in the form of a leakage signal; and which further comprises means for substantially eliminating the leakage signal radiated by the transmitter and received by the receiver.

8. An electromagnetic wave, reflective type, active proximity sensor as defined in claim 7, wherein the means for substantially eliminating the leakage signal comprises:

a beam splitter, the beam splitter being positioned between the transmitter and the target, the beam splitter being responsive to the radiated energy transmitted by the transmitter and generating a reflected signal portion and a transmitted signal portion, the reflected signal portion being reflected from the beam splitter to the proximity sensor and being approximately 180 degrees out of phase with the leakage signal received by the receiver, the transmitted signal portion being passed through the beam splitter to the target;

wherein the receiver receives the transmitted signal portion reflected from the target and the reflected signal portion reflected from the beam splitter, and whereby the reflected signal portion substantially cancels the leakage signal, while the detector generates an output signal which corresponds to the transmitted signal portion reflected from the target.

* * * * *